United States Patent [19]

Makino et al.

[11] Patent Number: 4,504,559
[45] Date of Patent: Mar. 12, 1985

[54] DISAZO COMPOUNDS AND PHOTOCONDUCTIVE COMPOSITION AS WELL AS ELECTROPHOTOGRAPHIC LIGHT SENSITIVE ELEMENT CONTAINING THE SAME

[75] Inventors: Naonori Makino; Seiji Horie; Kouichi Kawamura; Hideo Sato, all of Kanagawa, Japan

[73] Assignee: Fuji Photo Film Co., Ltd., Kanagawa, Japan

[21] Appl. No.: 546,663

[22] Filed: Oct. 28, 1983

[30] Foreign Application Priority Data

Oct. 28, 1982 [JP] Japan ................................. 57-189534

[51] Int. Cl.$^3$ .............................................. G03G 5/06
[52] U.S. Cl. ........................................ 430/58; 430/76; 430/78
[58] Field of Search ...................... 430/71, 72, 73, 74, 430/76, 78

[56] References Cited

U.S. PATENT DOCUMENTS 4,284,698  8/1981  Kazami et al. ................... 430/58 X
4,390,608  6/1983  Hashimoto et al. .............. 430/58 X

*Primary Examiner*—John D. Welsh
*Attorney, Agent, or Firm*—Sughrue, Mion, Zinn, Macpeak and Seas

[57] ABSTRACT

A photoconductive composition comprising a disazo compound represented by formula (I):

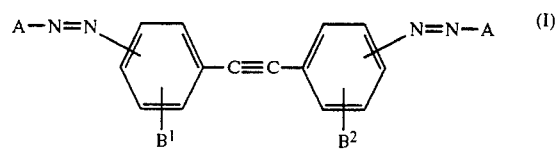

and an electrophotographic light sensitive element containing the compound. The element has a high sensitivity and high durability.

15 Claims, 1 Drawing Figure

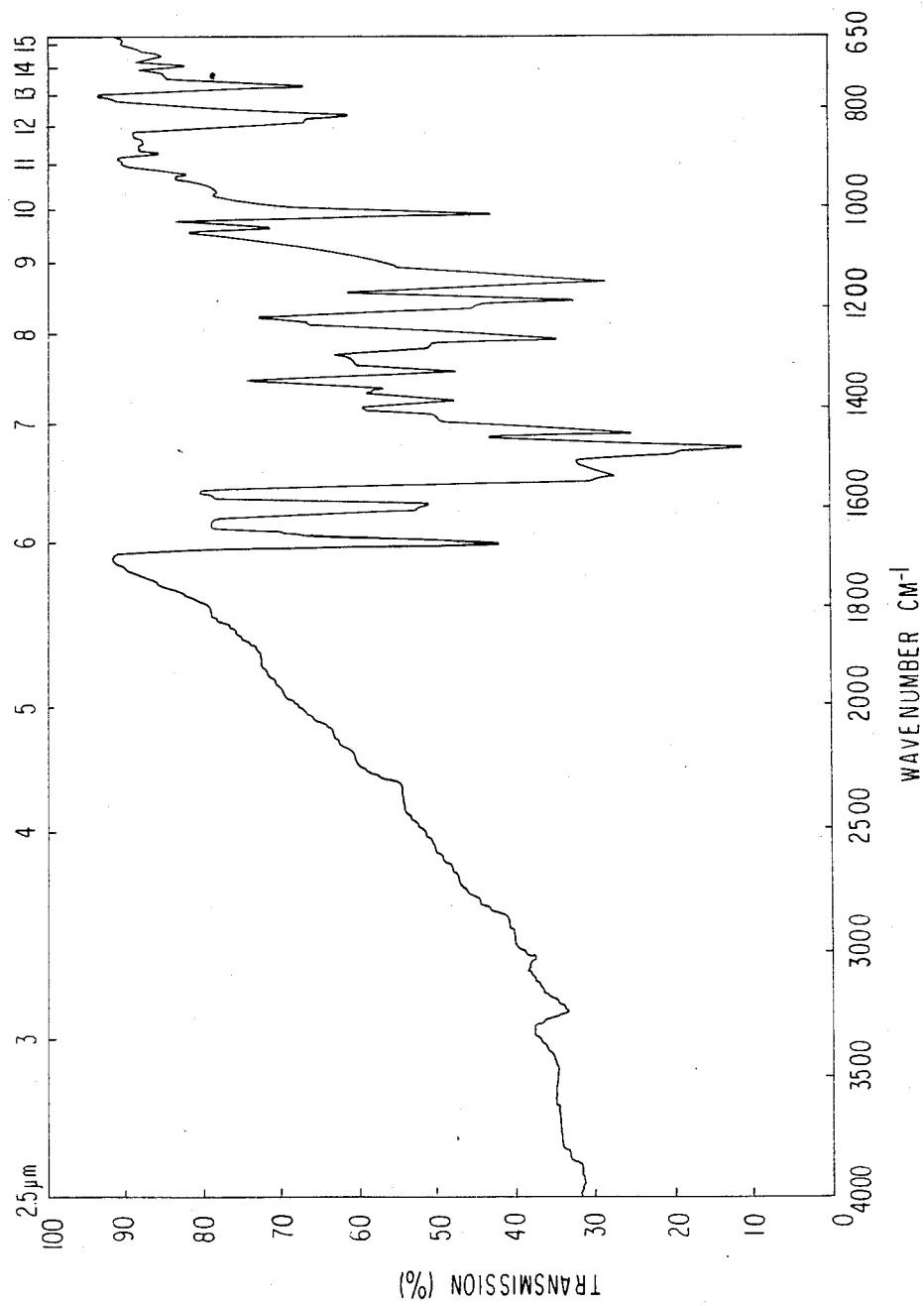

DISAZO COMPOUNDS AND PHOTOCONDUCTIVE COMPOSITION AS WELL AS ELECTROPHOTOGRAPHIC LIGHT SENSITIVE ELEMENT CONTAINING THE SAME

FIELD OF THE INVENTION

The present invention relates to a novel photoconductive composition containing a disazo compound as well as an electrophotographic light sensitive element comprising an electrophotographic light sensitive layer containing the disazo compound.

BACKGROUND OF THE INVENTION

A photoconductive process of an electrophotographic light sensitive element comprises:
(1) a step of generating electric charges due to exposure to light, and,
(2) a step of transporting the charges.

A typical example of a material in which steps (1) and (2) are carried out using the same substance such as a selenium light sensitive plate. On the other hand, as an example of materials in which steps (1) and (2) are effected by different substances, the combination of amorphous selenium and poly-N-vinyl-carbazole is well known. A method wherein steps (1) and (2) are effected by different substances is advantageous in that the range for selecting raw materials used for electrophotographic light sensitive elements is broadened, electrophotographic properties such as sensitivity, acceptable electric potentials, etc. of electrophotographic light sensitive elements are improved with the broadened range, and substances convenient for preparation of coating of electrophotographic light sensitive elements can be chosen over a wide range.

Typical examples of photoconductive substances of electrophotographic light sensitive elements which have been heretofore used in electrophography include inorganic substances such as selenium, cadmium sulfide, zinc oxide, etc.

Carlson has already clarified in U.S. Pat. No. 2,297,691, that a photoconductive substance comprising a support having coated thereon a material which is insulate in the dark and changes electrical resistivity depending upon the amount of imagewise exposure can be employed in electrophotography. First, surface charges are uniformly imparted to the photoconductive substance in the dark, generally after dark adaptation during a suitable period of time. Next, the substance is imagewise exposed by an irradiated pattern which has the effect of reducing the surface charges depending upon relative energy contained in various parts of the irradiated pattern. The surface charges of electrostatic latent images thus remaining at the surface of a layer of the photoconductive substance (electrophotographic light sensitive layer) are converted into visible images by bringing the surface into contact with a suitable indicator for detecting charges, i.e., a toner.

Toners are contained in an insulating solution or a dry carrier; in any case, toners can be adhered to the surface of an electrophotographic light sensitive layer depending upon charge pattern. The thus adhered indicator can be fixed by conventional means such as heat, pressure, solvent vapor, etc. Further, electrostatic latent images can be transferred to a second support (e.g., paper, film, etc.). In a similar manner, it is possible to transfer electrostatic latent images to a second support and develop there. Electrophotography is one of the image-forming methods designed so as to form images as described above.

In such electrophotography, the following basic properties are required for electrophotographic light sensitive elements:
(1) electrophotographic light sensitive elements are electrically charged to an appropriate potential in the dark;
(2) discipitation of charges is less in the dark;
(3) charges can be readily discharged by light exposure; etc.

Inorganic substances described above that are conventionally employed have many advantages but also have various disadvantages. For example, selenium which is now widely used satisfies the requirements (1) to (3) described above but it is not desirable because it is difficult to set forth conditions for production thereof, production costs are high, it is difficult to finish up selenium to a belt form due to lack of flexibility, and care must be taken when handling selenium due to its sensitivity to heat and mechanical impact, etc. Cadmium sulfide or zinc oxide is dispersed in a resin as a binder and the dispersion is used as an electrophotographic light sensitive element; but due to mechanical drawbacks in smoothness, hardness, tensile strength, anti-abrasion, etc., they cannot be used repeatedly.

In recent years, electrophotographic light sensitive elements using various organic substances have been proposed to eliminate the drawbacks of such inorganic substances and, some are provided for actual use. For example, there are an electrophotographic light sensitive element comprising poly-N-vinylcarbazole and 2,4,7-trinitrofluoren-9-one (U.S. Pat. No. 3,484,237), an electrophotographic light sensitive element comprising poly-N-vinylcarbazole sensitized with a pyrilium salt dyestuff (U.S. Pat. No. 3,617,268), an electrophotographic light sensitive element comprising an organic pigment as a main ingredient (Japanese Patent Publication No. 11945/'81, Japanese Patent Application (OPI) Nos. 133445/'78 and 116039/'81, and U.S. Pat. No. 3,898,084) an electrophotographic light sensitive element containing as a main ingredient a co-crystal complex comprising a dye and a resin (U.S. Pat. Nos. 3,732,180 and 3,684,502), etc.

In these organic electrophotographic light sensitive elements, mechanical properties and flexibility of the aforesaid inorganic electrophotographic light sensitive elements are improved to some extent but light sensitivity is generally poor and they are unsuited for repeated use; these conventional electrophotographic light sensitive elements do not sufficiently meet the requirements for electrophotographic light sensitive elements.

SUMMARY OF THE INVENTION

As a result of extensive investigations with an attempt to improve the foregoing drawbacks involved in conventional electrophotographic light sensitive elements, the present inventors have found that electrophotographic light sensitive elements containing disazo compound have high sensitivity and long durability to such an extent that can be provided sufficiently for actual use.

The present invention relates to a photoconductive composition comprising a disazo compound (disazo pigment) represented by the following general formula (I) and an electrophotographic light sensitive element comprising an electrophotographic light sensitive layer containing the disazo compound.

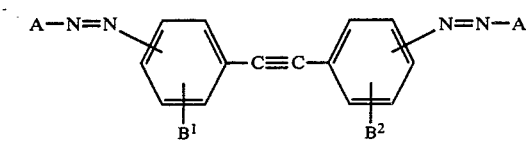

wherein:

A represents

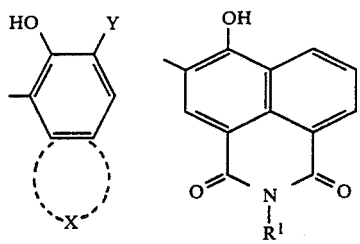

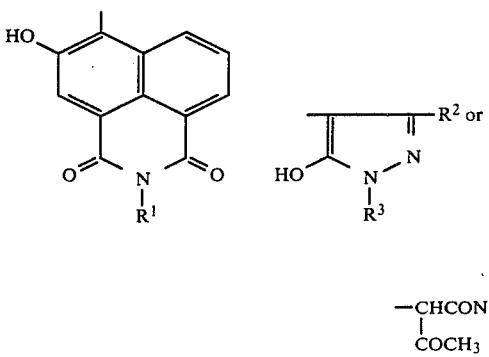

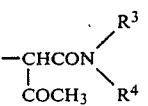

$B^1$ and $B^2$, which may be the same or different, represents a hydrogen atom, a lower alkyl group, an alkoxy group or a halogen atom.

X represents an atomic group necessary to complete an aromatic ring or a heterocyclic ring (these rings may be substituted or unsubstituted), by condensing with the benzene ring in the above formula to which a hydroxy group and Y are attached;

Y represents:

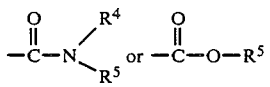

$R^1$ represents a hydrogen atom, an alkyl group, a phenyl group or a substituted group thereof;

$R^2$ represents a hydrogen atom, a lower alkyl group, a carbamoyl group, a carboxyl group, an alkoxycarbonyl group, an aryloxycarbonyl group, or a substituted or unsubstituted amino group;

$R^3$ and $R^5$ each represents an alkyl group; an aromatic ring group, a heterocyclic aromatic ring group, or a substituted group thereof;

$R^4$ represents a hydrogen atom, an alkyl group, a phenyl group or a substituted group thereof.

BRIEF DESCRIPTION OF THE DRAWING

The FIGURE is an infrared absorption spectrum (KBr method) of disazo compound (13A) used in the present invention.

DETAILED DESCRIPTION OF THE PREFERRED EMBODIMENTS

The disazo compounds represented by general formula (I) is described below in more detail.

X is a group capable of forming an aromatic ring such as a naphthalene ring, an anthracene ring, etc. or a heterocyclic ring such as an indole ring, a carbazole ring, a benzocarbazole ring, a dibenzofuran ring, etc., by condensing with the benzene ring to which a hydroxyl group and Y are attached.

When X is an aromatic ring or heterocyclic ring having a substituent(s) thereon, examples of substituents include a halogen atom (e.g., a fluorine atom, a chlorine atom, a bromine atom, etc.), a lower alkyl group, preferably a lower alkyl group having 1 to 8 carbon atoms (e.g., a methyl group, an ethyl group, a propyl group, a butyl group, an isopropyl group, an isobutyl group, etc.). The number of the substituent(s) is 1 or 2; when the substituents are 2, they may be the same or different.

Examples of $R^1$ include a hydrogen atom, an alkyl group, preferably an alkyl group having 1 to 12 carbon atoms, or a phenyl group.

When $R^1$ is an unsubstituted alkyl group, specific examples thereof include a methyl group, an ethyl group, a propyl group, a butyl group, a pentyl group, a hexyl group, an isopropyl group, an isobutyl group, an isoamyl group, an isohexyl group, a neopentyl group, a tert-butyl group, etc.

When $R^1$ is a substituted alkyl group, the substituents are exemplified by a hydroxy group, an alkoxy group having 1 to 12 carbon atoms, a cyano group, an amino group, an alkylamino group having 1 to 12 carbon atoms, a dialkylamino group having 2 alkyl groups having 1 to 12 carbon atoms, a halogen atom, an aryl group having 6 to 15 carbon atoms, etc. Specific examples of substituted alkyl groups include a hydroxyalkyl group (e.g., a hydroxymethyl group, a 2-hydroxyethyl group, a 3-hydroxypropyl group, a 2-hydroxypropyl group, etc.), an alkoxyalkyl group (e.g., a methoxymethyl group, a 2-methoxyethyl group, a 3-methyxypropyl group, an ethoxymethyl group, a 2-ethoxyethyl group, etc.), a cyanoalkyl group (e.g., a cyanomethyl group, a 2-cyanoethyl group, etc.), an aminoalkyl group (e.g., an aminomethyl group, a 2-aminoethyl group, a 3-aminopropyl group, etc.), an (alkylamino)alkyl group (e.g., a (methylamino)methyl group, a 2-(methylamino)ethyl group, an (ethylamino)methyl group, a (dialkylamino)alkyl group (e.g., a (dimethylamino)-methyl group, a 2-(dimethylamino)-ethyl group, etc.), a halogenoalkyl group (e.g., a fluoromethyl group, a chloromethyl group, a bromomethyl group, etc.) and an aralkyl group (e.g., a benzyl group, a phenethyl group, etc.).

When $R^1$ is a substituted phenyl group, substituents are exemplified by a hydroxy group, an alkoxy group having 1 to 12 carbon atoms, a cyano group, an amino group, an alkylamino group having 1 to 12 carbon atoms, dialkylamino groups having two alkyl groups having 1 to 12 carbon atoms, a halogen atom, an alkyl group having 1 to 6 carbon atoms, nitro group, etc. Specific examples of substituted phenyl groups include a hydroxyphenyl group, an alkoxyphenyl group (e.g., a methoxyphenyl group, an ethoxyphenyl group, etc.), a cyanophenyl group an aminophenyl group, an (alkylamino)phenyl group (e.g., a (methylamino)phenyl group, an (ethylamino)phenyl group, etc.), a (dialkylamino)phenyl group (e.g., a (dimethylamino)phenyl group, etc.), a halogenophenyl group (e.g., a fluorophenyl group, a chlorophenyl group, a bromophenyl group, etc.), an alkylphenyl group (e.g., a tolyl group, an ethylphenyl group, a cumenyl group, a xylyl group, a mesityl group, etc.), a nitrophenyl group, and sunstituents (positions of the substituents and positional relation of plural substituents are optional) having 2 or 3 or these groups (which may be the same or different).

For $R^2$, a hydrogen atom, a lower alkyl group having 1 to 6 carbon atoms, a carbamoyl group, a carboxyl group, an alkoxycarbonyl group having 1 to 12 carbon atoms, an aryloxycarbonyl group having an aryloxy group having 6 to 12 carbon atoms and a substituted or unsubstituted amino group are preferred.

When $R^2$ is a substituted amino group, specific examples thereof include a methylamino group, an ethylamino group, a propylamino group, a phenylamino group, a tolylamino group, a benzylamino group, a phenethylamino group, a dimethylamino group, a diethylamino group, a diphenylamino group, etc.

When $R^2$ is a lower alkyl group, specific examples thereof include a methyl group, an ethyl group, a propyl group, a butyl group, an isopropyl group, an isobutyl group, etc.

When $R^2$ is an alkoxycarbonyl group, specific examples thereof include a methoxycarbonyl group, an ethoxycarbonyl group, a propoxycarbonyl group, a butoxycarbonyl group, an isopropoxycarbonyl group, a benzyloxycarbonyl group, etc.

When $R^2$ is an aryloxycarbonyl group, specific examples thereof include a phenoxycarbonyl group, a tolyloxycarbonyl group, etc.

Preferred examples of $R^3$ and $R^5$, include an alkyl group having 1 to 20 carbon atoms, an aromatic ring group such as a phenyl group, a naphthyl group, etc., a heterocyclic aromatic ring group containing an oxygen atom, a nitrogen atom, a sulfur atom, etc., such as a dibenzofuranyl group, a carbozolyl group, etc. and substituted groups thereof.

When $R^3$ or $R^5$ is a substituted or unsubstituted alkyl group, specific examples thereof are the same as those for the substituted or unsubstituted alkyl group for $R^1$ described above, respectively.

When $R^3$ or $R^5$ is a substituted aromatic group such as a substituted phenyl group, a substituted naphthyl group, etc., or a substituted heterocyclic aromatic group containing a hetero atom, such as a substituted dibenzofuranyl group or a substituted carbazolyl group, etc., specific examples of the substituents include a hydroxy group, a cyano group, a nitro group, a halogen atom (e.g., a fluorine atom, a chlorine atom, a bromine atom, an iodine atom), an alkyl group having 1 to 12 carbon atoms (e.g., a methyl group, an ethyl group, a propyl group, an isopropyl group, etc.), an alkoxy group having 1 to 12 carbon atoms (e.g., a methoxy group, an ethoxy group, a propoxy group, a butoxy group, a pentyloxy group, an isopropoxy group, an isobutoxy group, an isoamyloxy group, a tertbutoxy group, a neopentyloxy group, etc.), an amino group, an alkylamino group having 1 to 12 carbons atoms (e.g., a methylamino group, an ethylamino group, a propylamino group, etc.), a dialkylamino group having 1 to 12 carbon atoms (e.g., a dimethylamino group, a diethylamino group, an N-methyl-N-ethylamino group, etc.), an arylamino group having 6 to 12 carbon atoms, (e.g., a phenylamino group, a tolylamino group, etc.), a diarylamino group having 2 aryl groups having 6 to 15 carbon atoms (e.g., a diphenylamino group, etc.), a carboxyl group, an alkali metal carboxylate group (examples of alkali metals (cations): Na+, K+, Li+, etc.), an alkali metal sulfonate group (examples of alkali metals (cations); Na+, K+, Li+, etc.), a sulfo group, a sulfonamide group, an alkylcarbonyl group (e.g., an acetyl group, a propionyl group, a benzylcarbonyl group, etc.), an arylcarbonyl group having an aryl group having 6 to 12 carbon atoms (e.g., a benzyl group, a toluoyl group, etc.), an alkylthio group having 1 to 12 carbon atoms (e.g., a methylthio group, an ethylthio group, etc.), or an arylthio group having 1 to 12 carbon atoms (e.g., a phenylthio group, a tolylthio group, etc.). The number of the substituent(s) is in the range of 1 to 3; in the case of binding plural substituents, they may be the same or different or may take an optional combination and, the position of the substituents attached is optional.

Examples of $R^4$ include a hydrogen atom, an alkyl group having 1 to 20 carbon atoms, a phenyl group or substituted groups thereof.

When $R^4$ is a substituted or unsubstituted alkyl or phenyl group, specific examples thereof are the same as those for the substituted or unsubstituted alkyl group and phenyl group in $R^3$ and $R^5$ described above.

$B^1$ and $B^2$ may be the same or different, and each represents a hydrogen atom, a lower alkyl group preferably having 1–6 carbon atoms, an alkoxy group preferably having 1–4 carbon atoms (e.g., a methoxy group, ethoxy group, n-propoxy group, i-propoxy group, n-butoxy group, t-butoxy group, etc.) and a halogen atom (fluorine atom, a chlorine atom, an iodine atom, bromine). The preferable total number of the above-described substituent is 1–4.

Two azo groups substituted on benzene rings of formula (I) may be substituted on optional positions on the benzene rings. There are six possible ways for substitution as shown below;

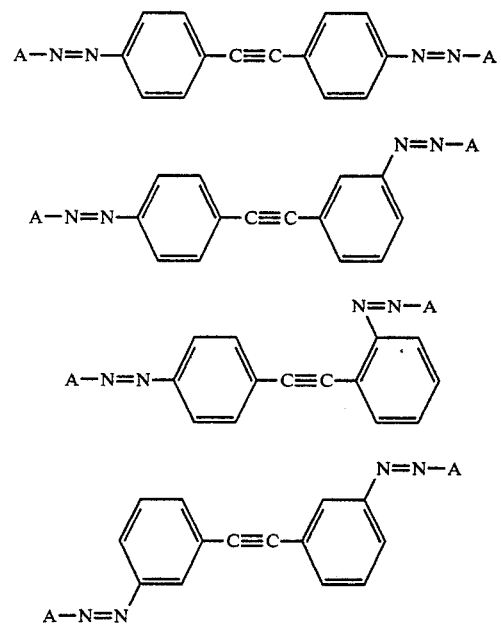

-continued

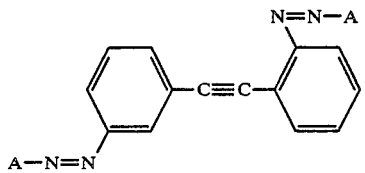

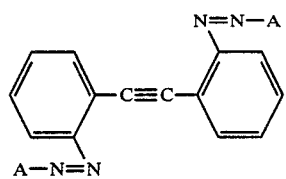

Among these compounds, the following compound is preferred in that they provide photoconductive compositions or electrophotographic light sensitive layers having high sensitivity to light. Further, raw materials for synthesis can easily be obtained so that disazo compounds can be prepared at a low cost.

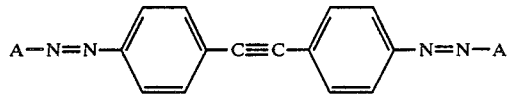

As A derived from couplers,

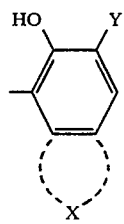

is preferred in that they provide photoconductive compositions or electrophotographic light sensitive layers having high sensitivity to light. Further, raw materials for synthesis can easily be obtained so that disazo compounds can be prepared at low costs.

Further, a group capable of forming a benzene ring, a carbozole ring, or a dibenzofuran ring are preferred as X and as Y,

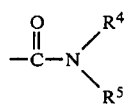

is preferred.

Hereafter specific examples of the disazo compounds of the present invention are given.

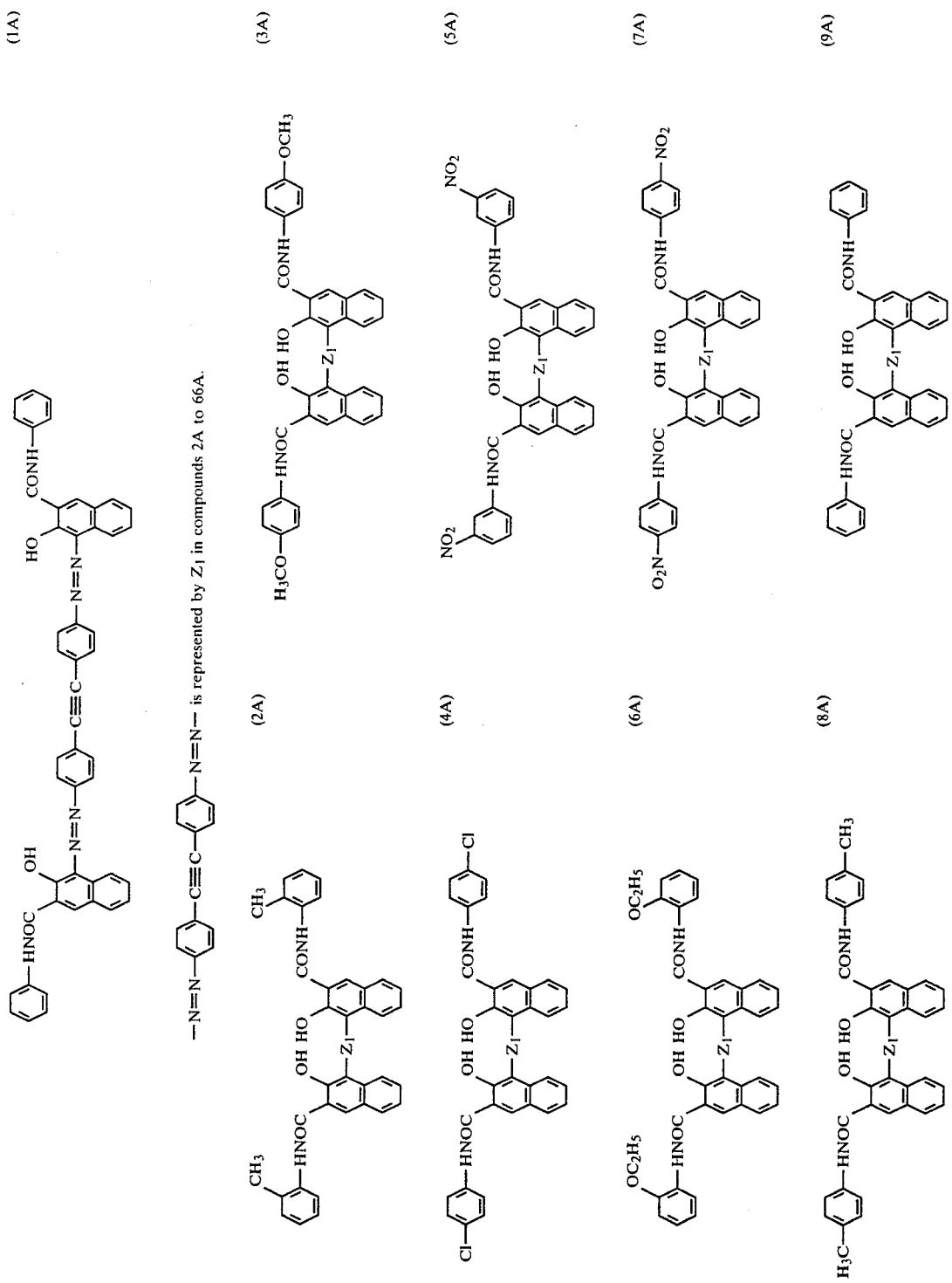

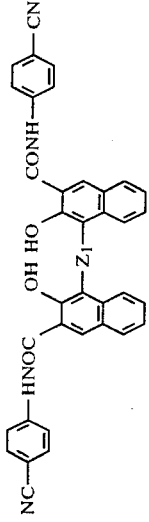 (20A)
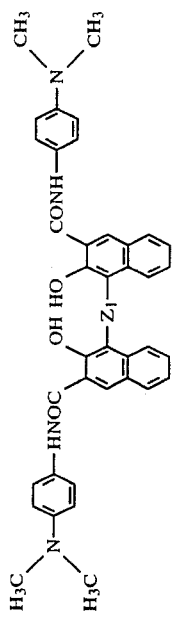 (21A)
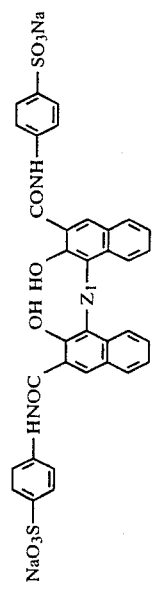 (22A)
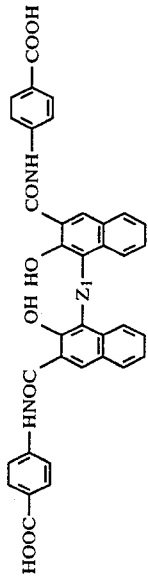 (23A)
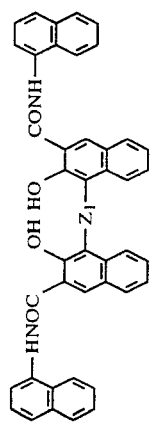 (24A)
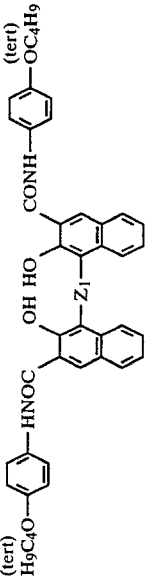 (25A)
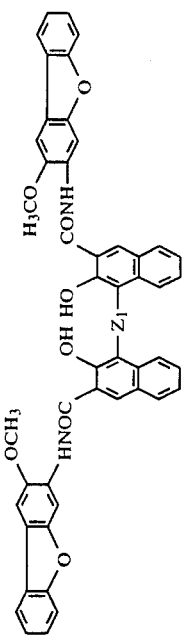 (26A)
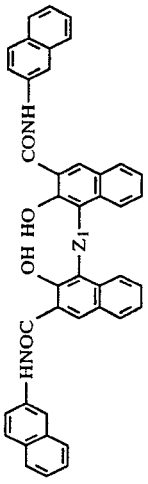 (27A)
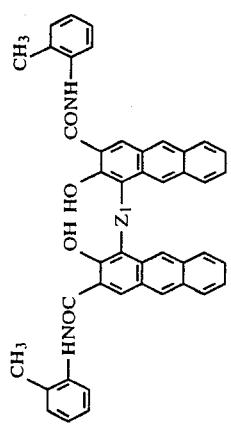 (28A)
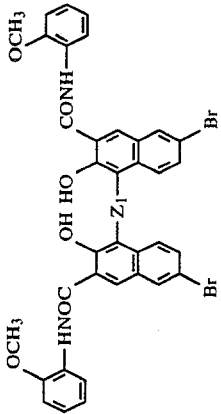 (29A)

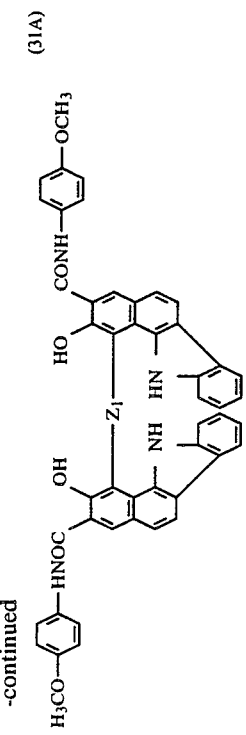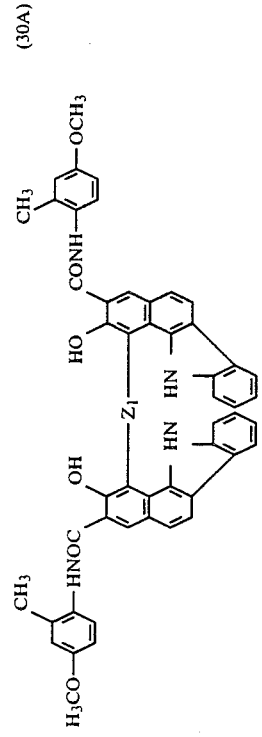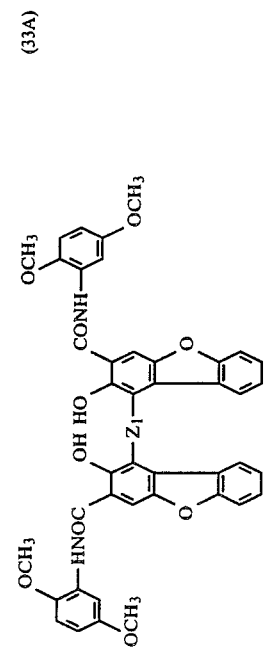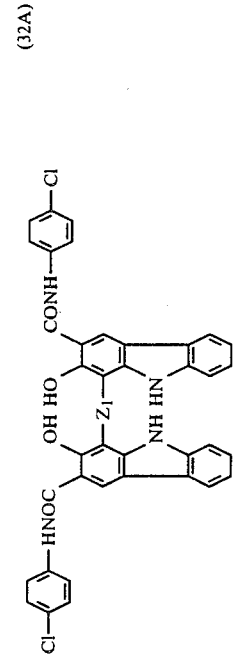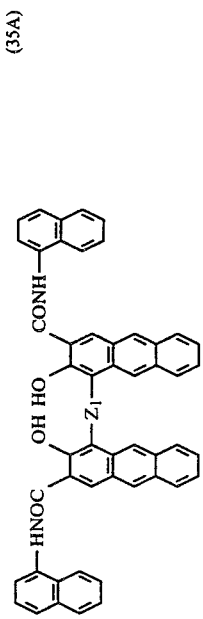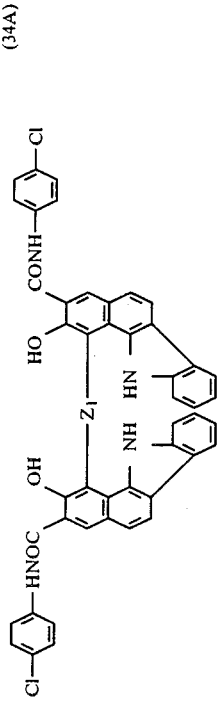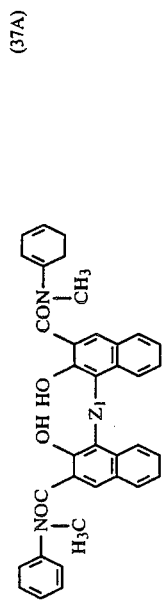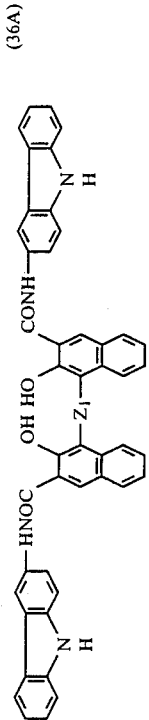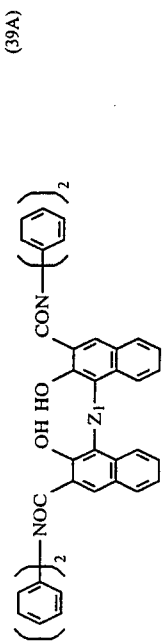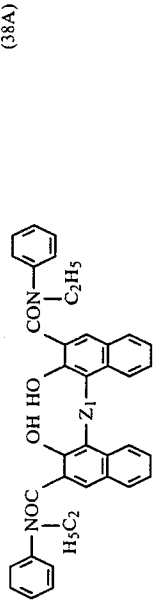

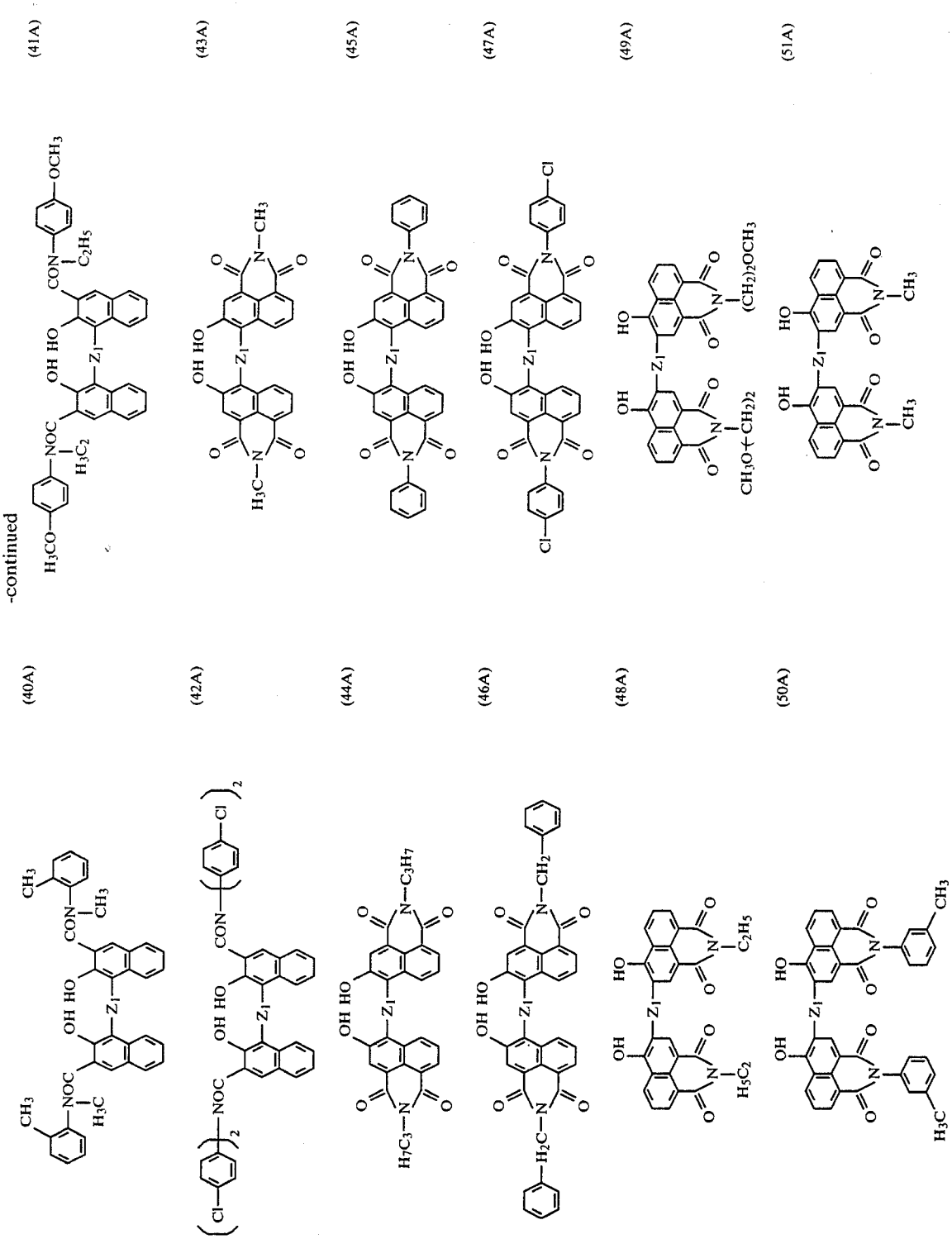

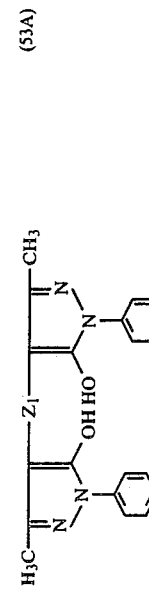 (52A)
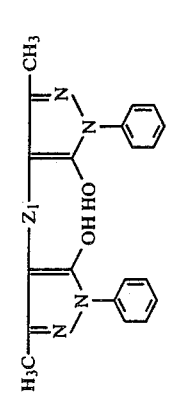 (53A)
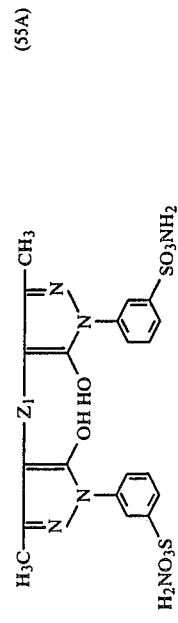 (54A)
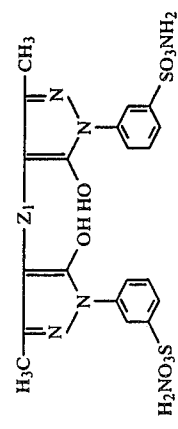 (55A)
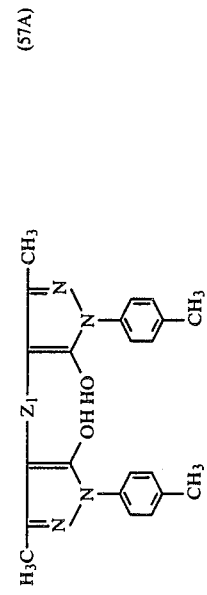 (56A)
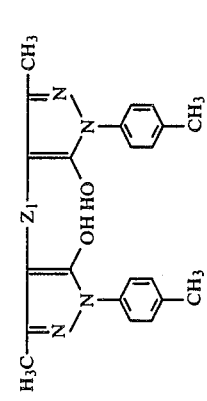 (57A)
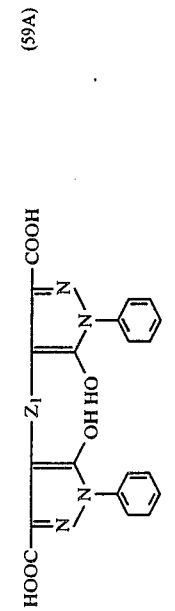 (58A)
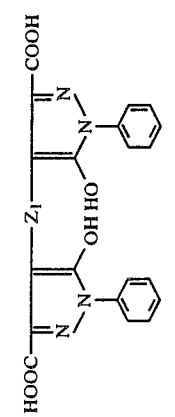 (59A)
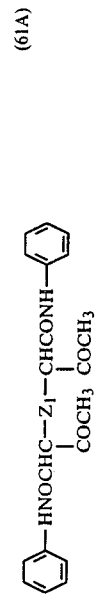 (60A)
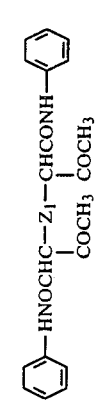 (61A)
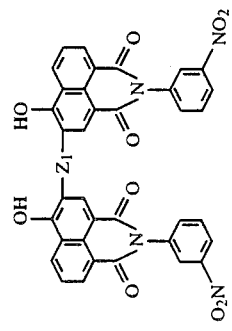
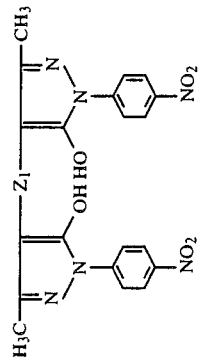
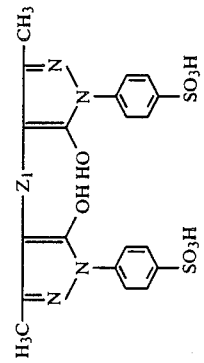
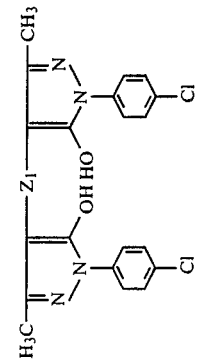
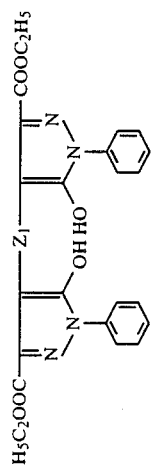

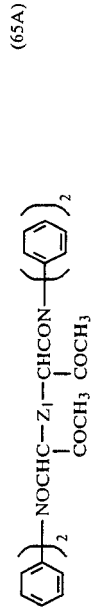
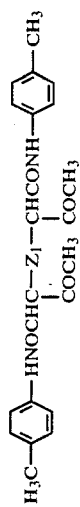
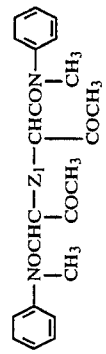
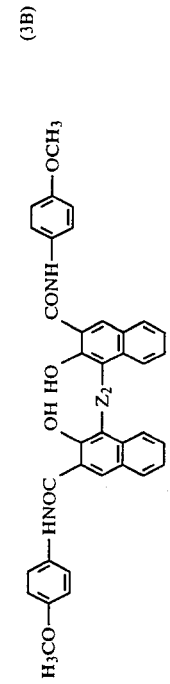
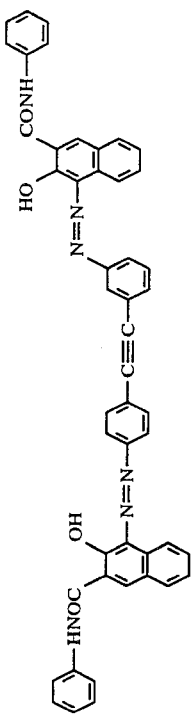
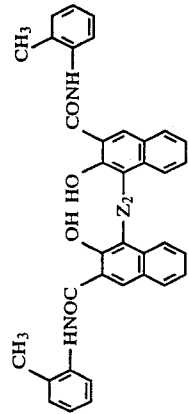
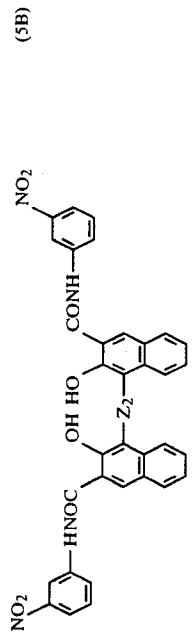
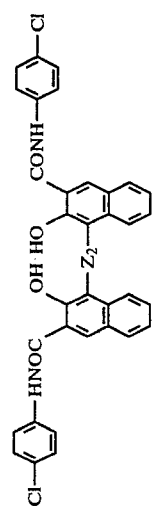

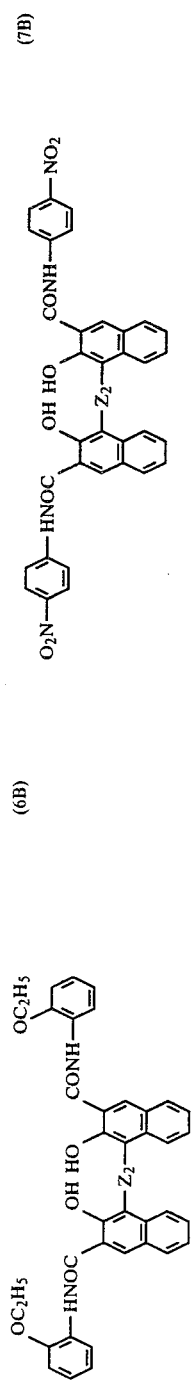
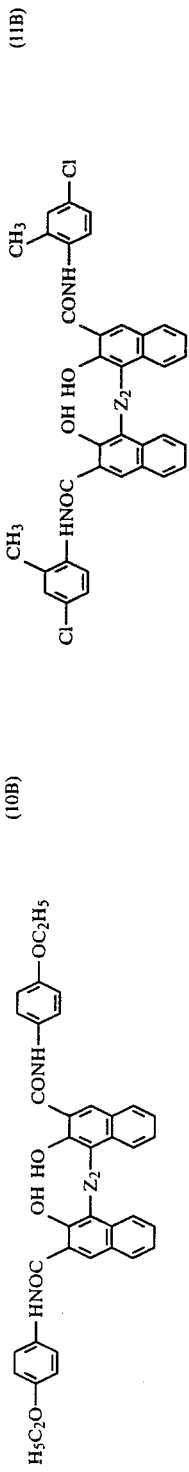
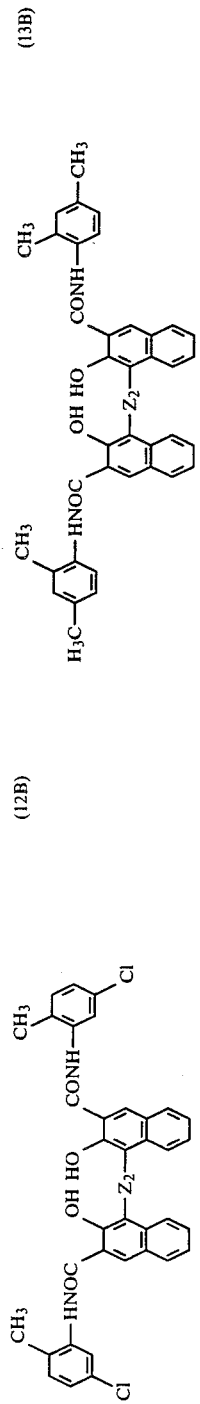

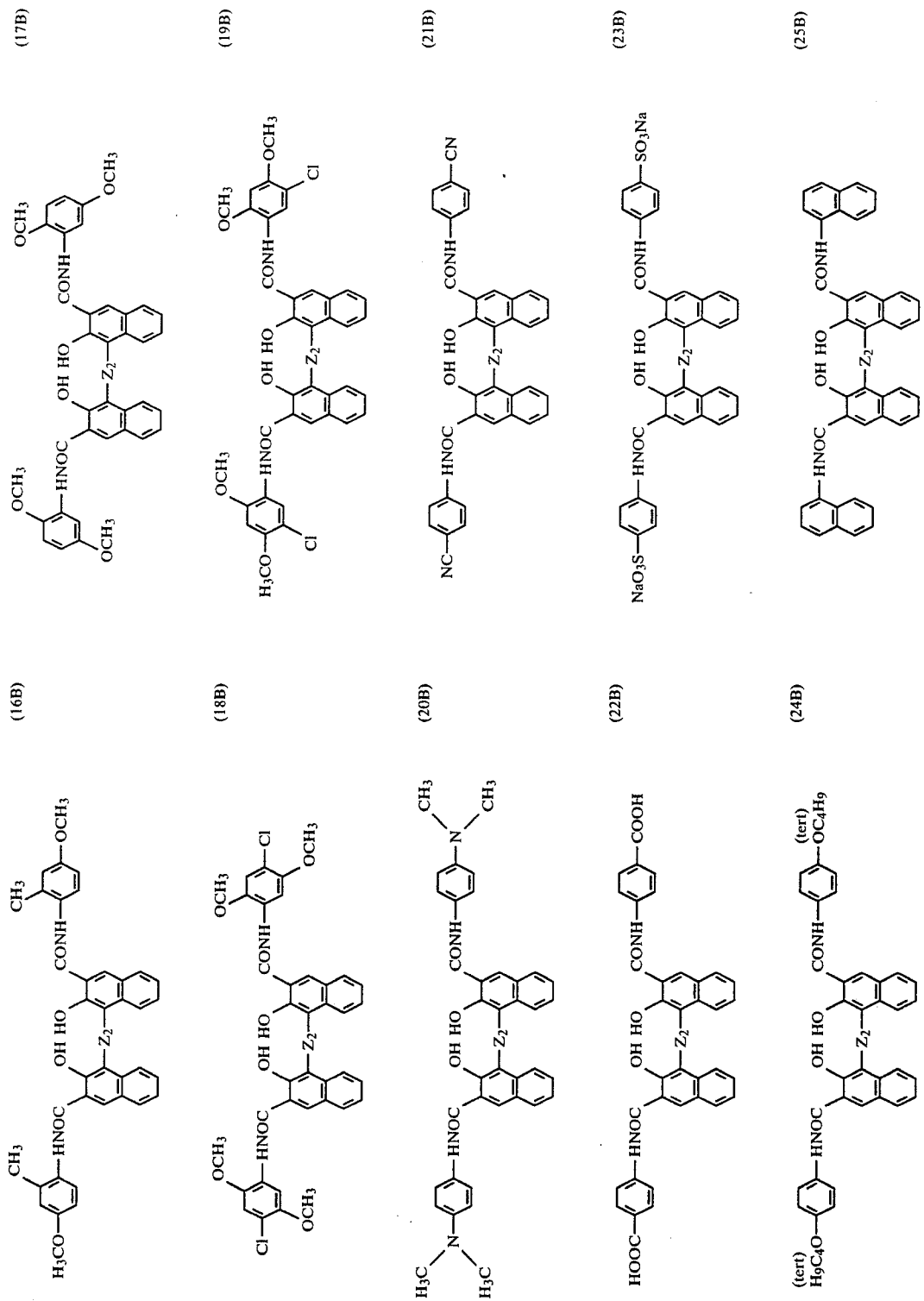

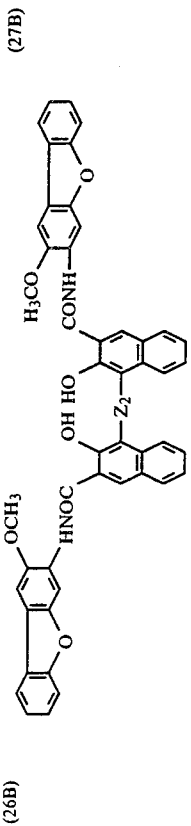
(26B)
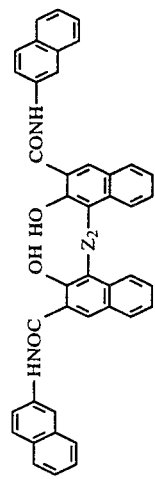
(27B)
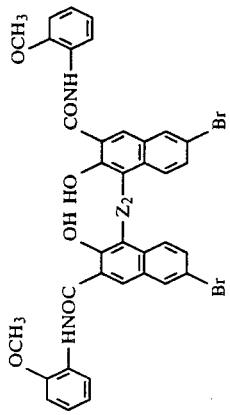
(28B) (29B)
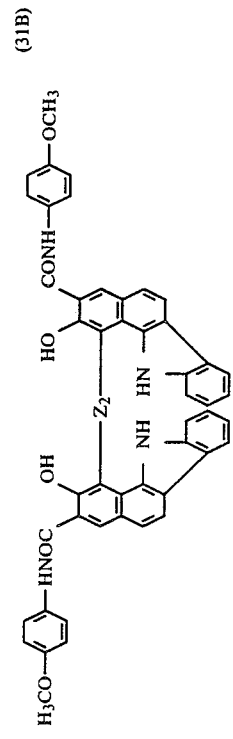
(30B)
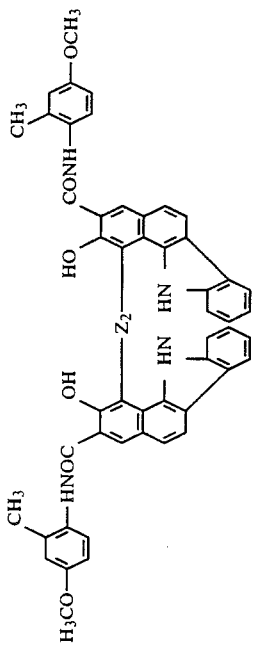
(31B)
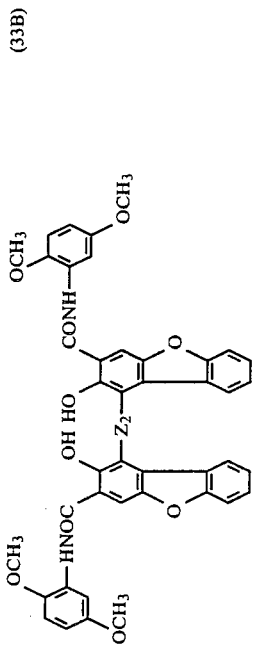
(32B)
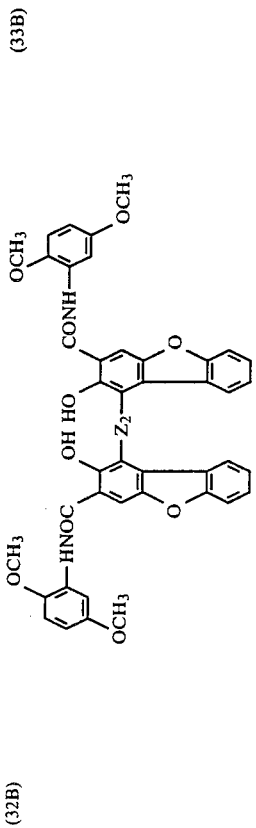
(33B)
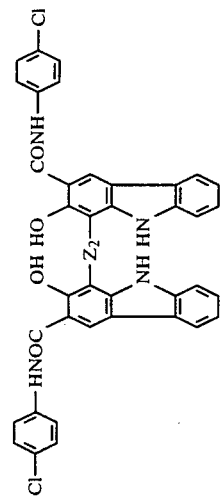

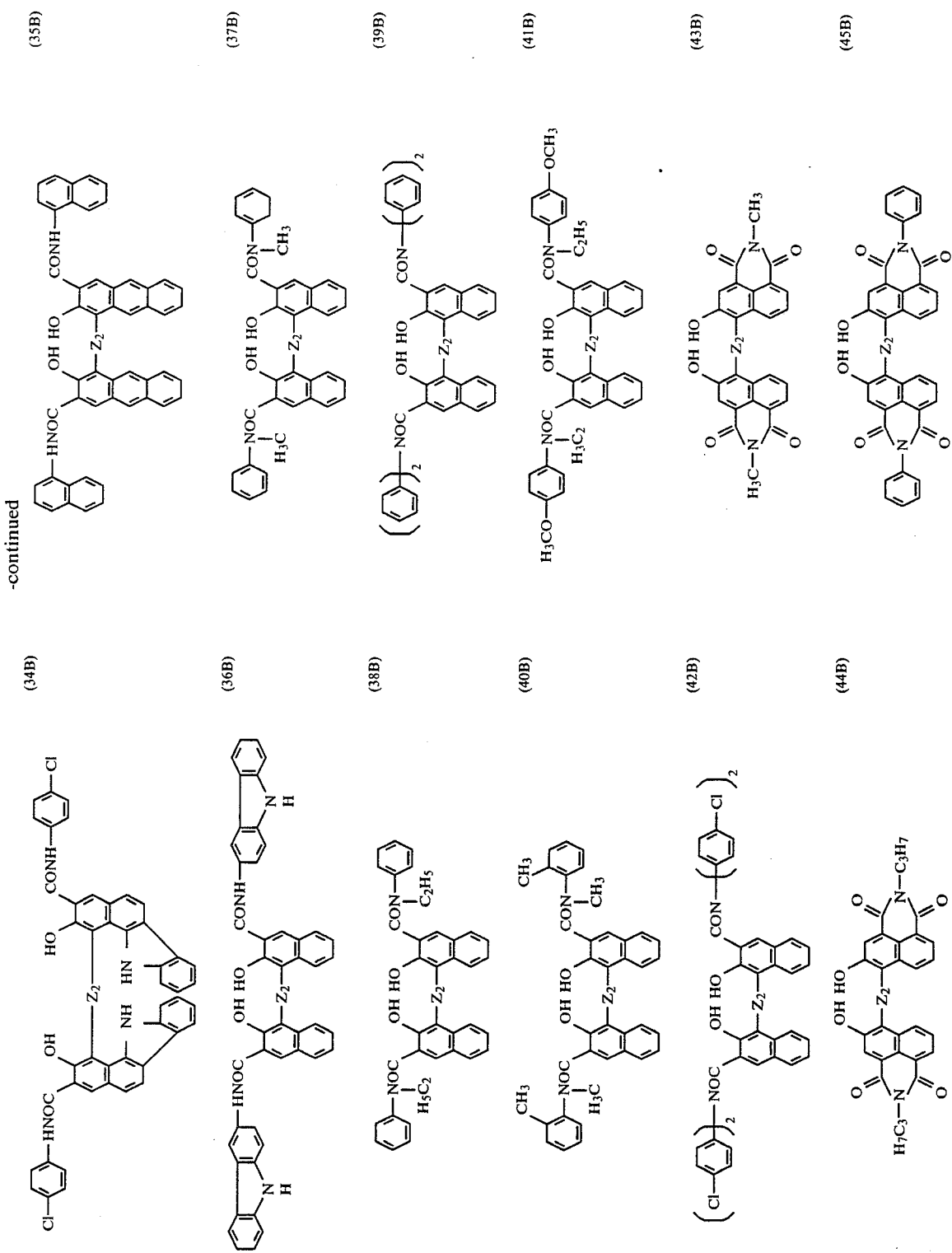

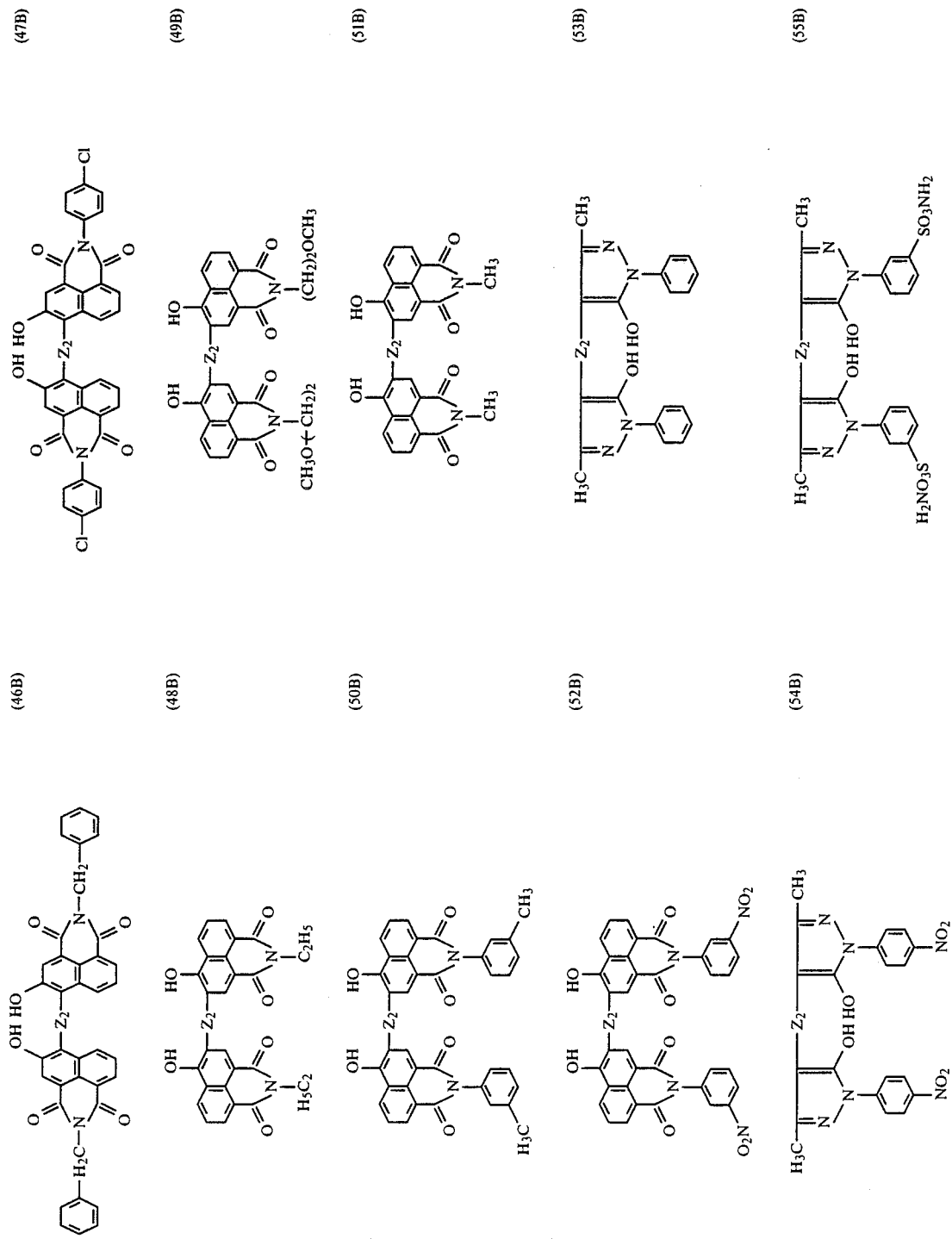

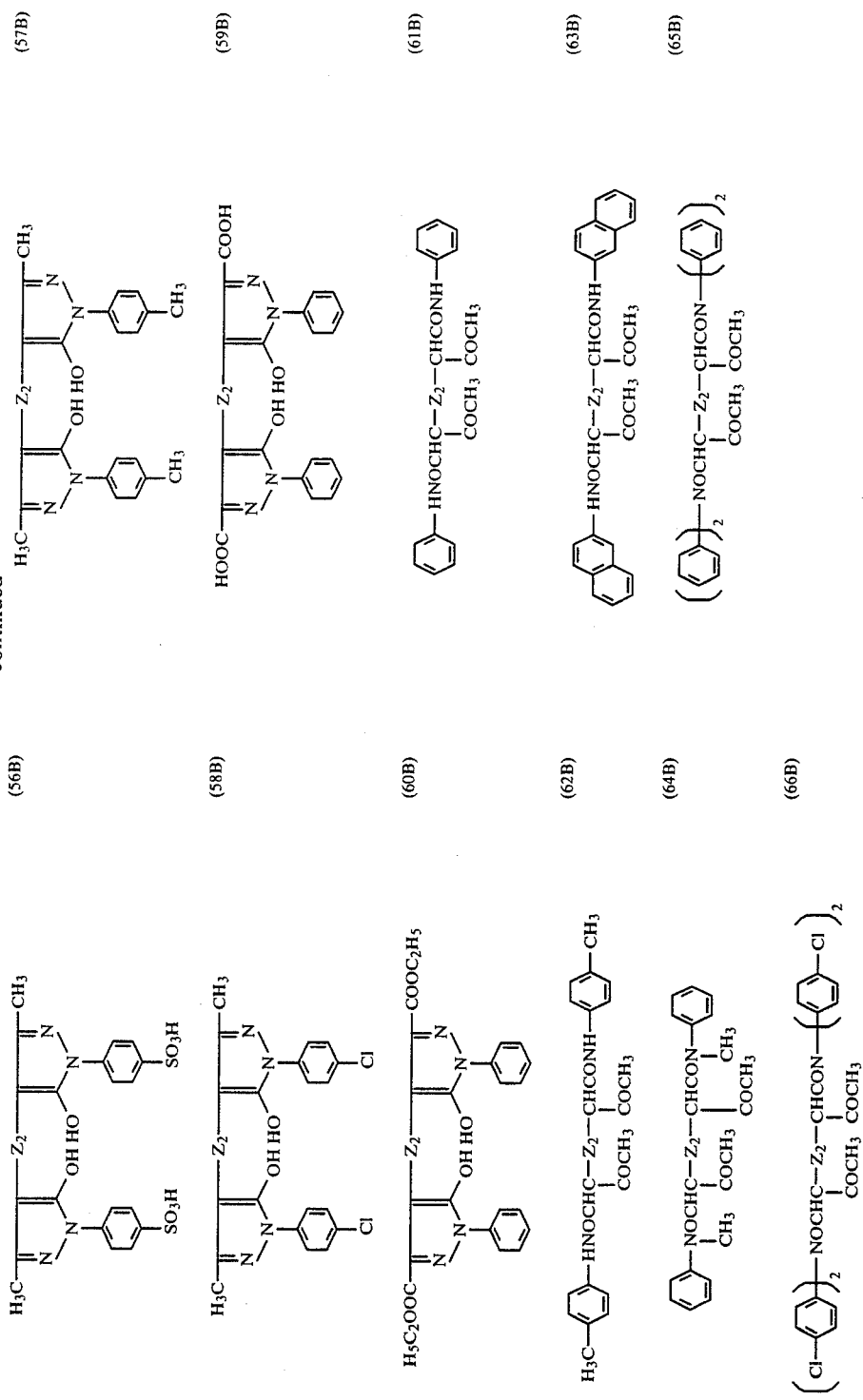

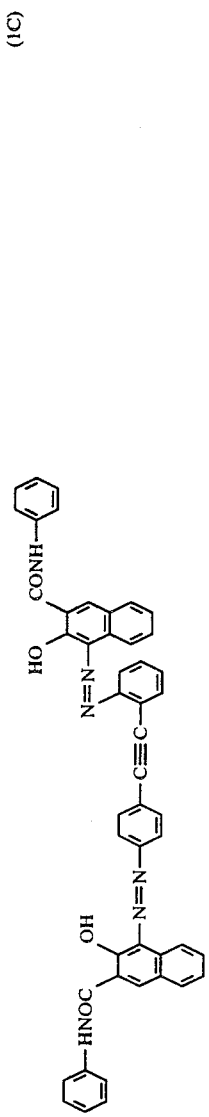
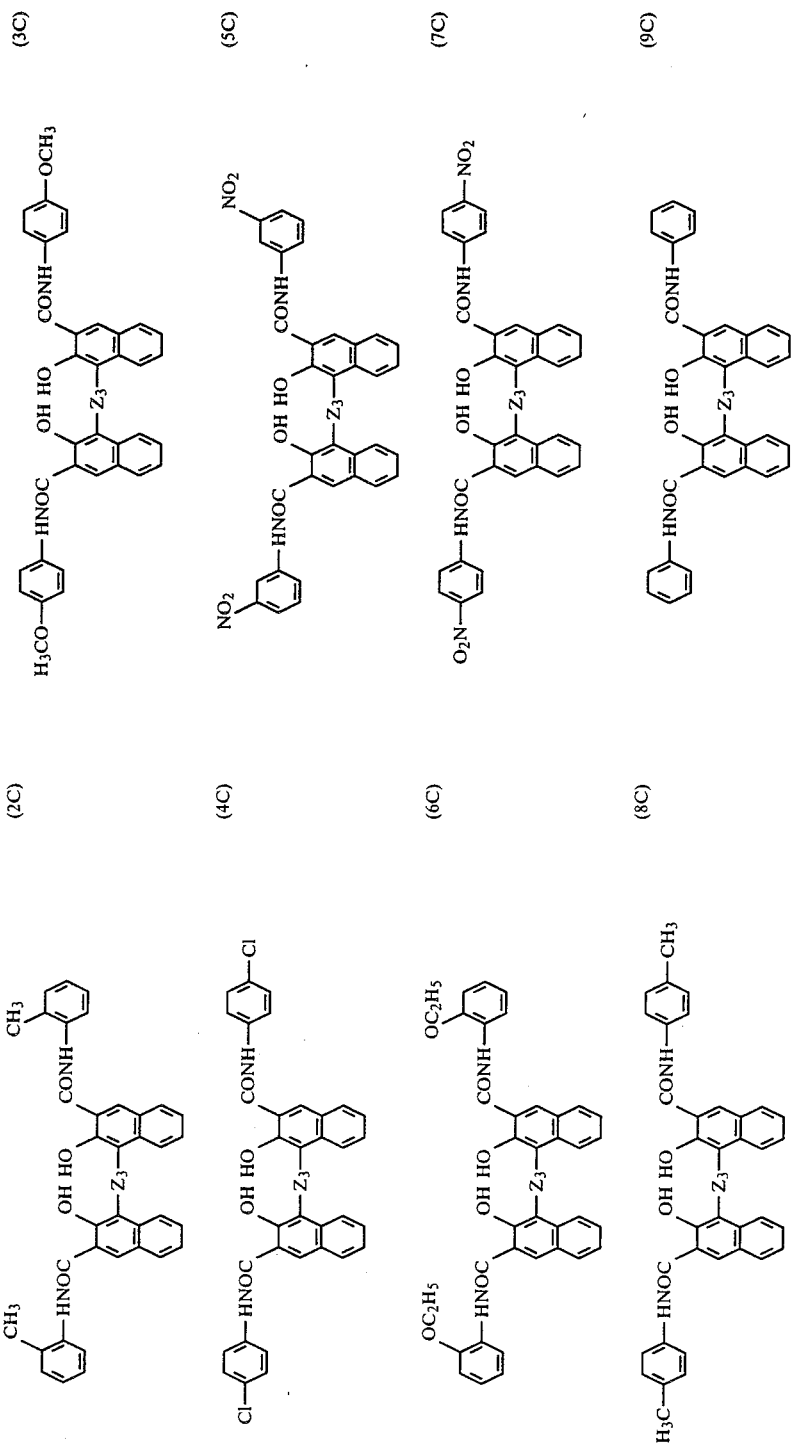

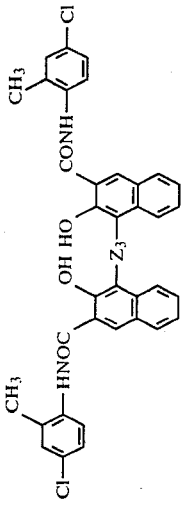 (10C)
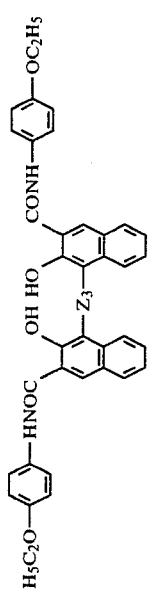 (11C)
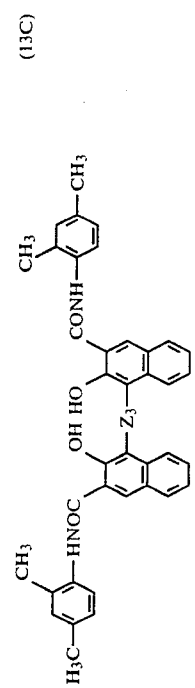 (12C)
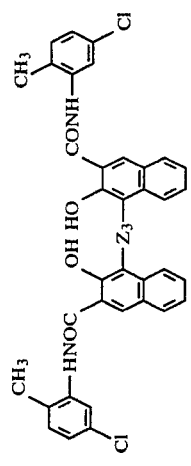 (13C)
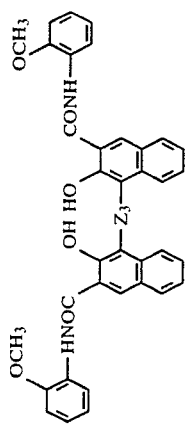 (14C)
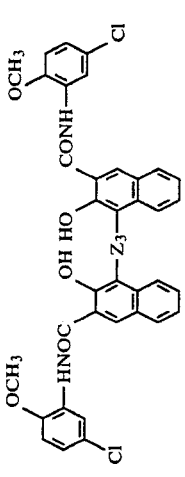 (15C)
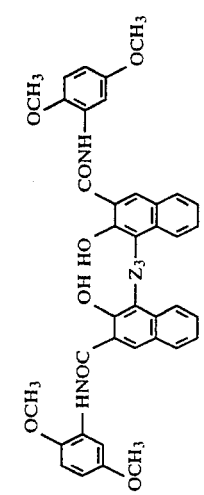 (16C)
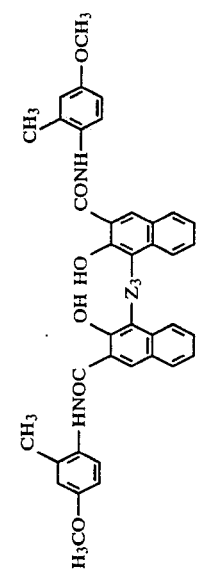 (17C)
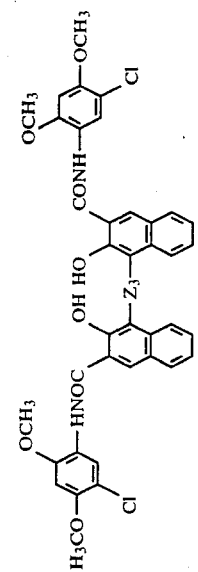 (18C)
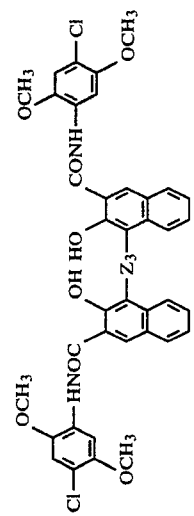 (19C)

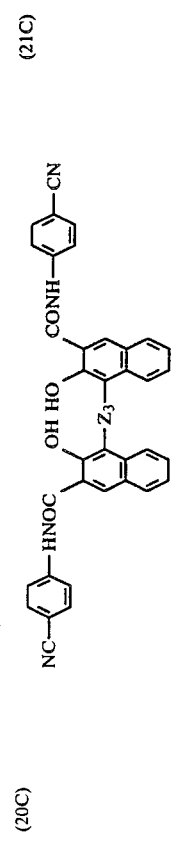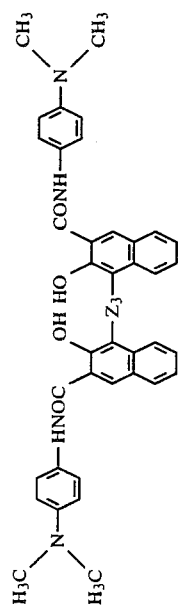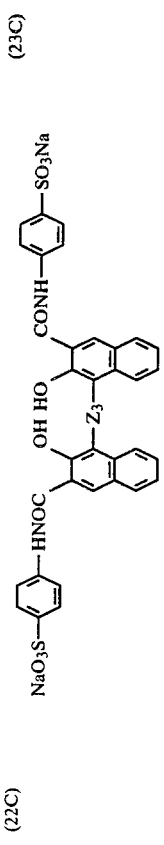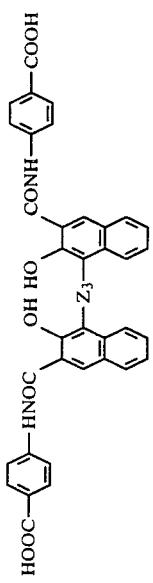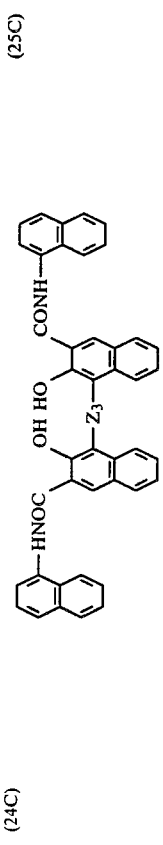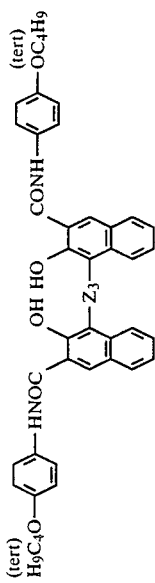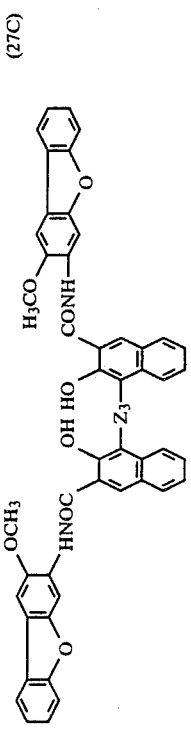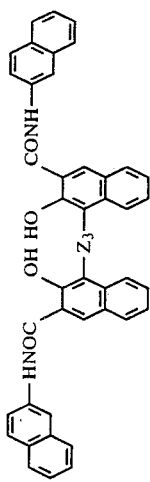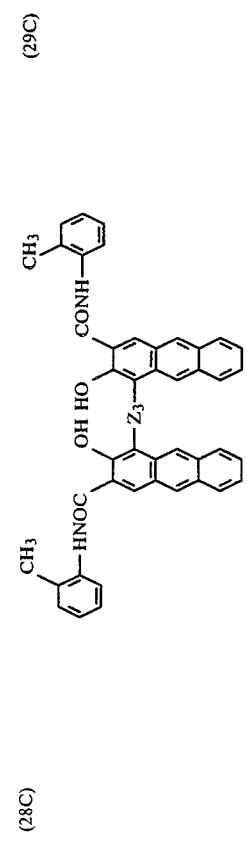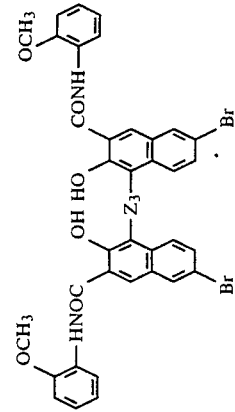

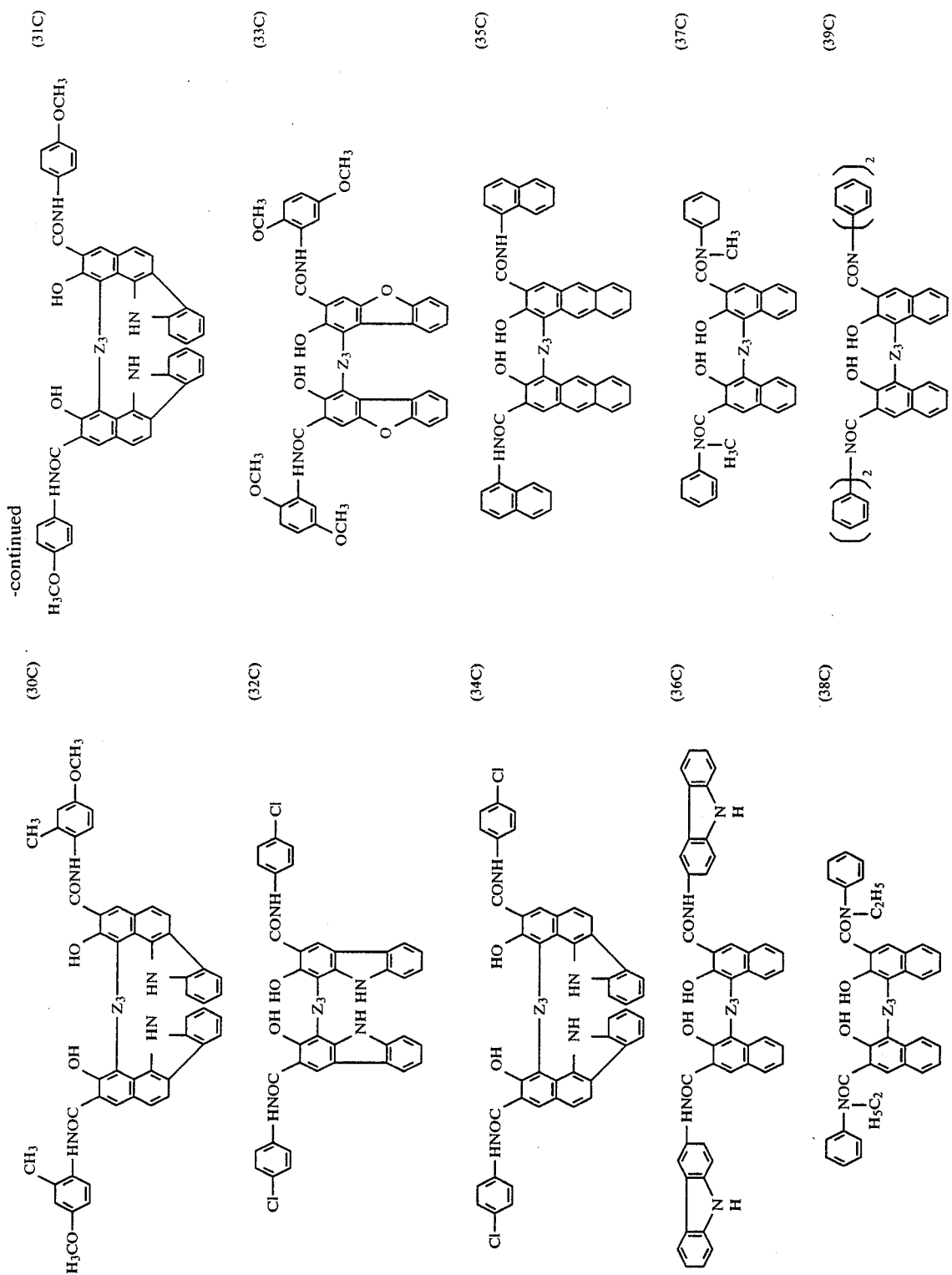

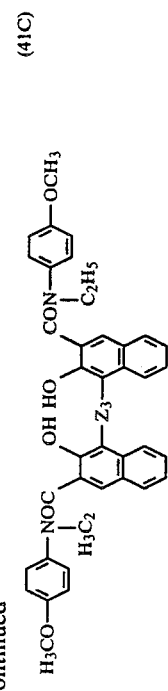
(40C)
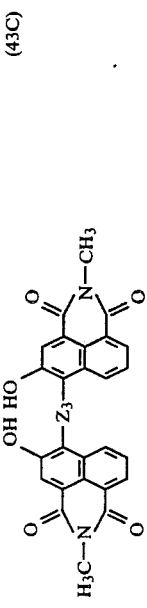
(42C)
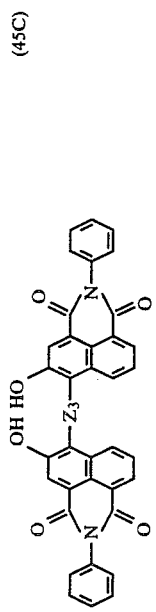
(44C)
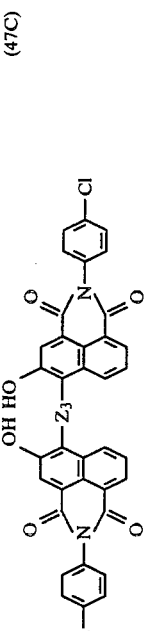
(46C)
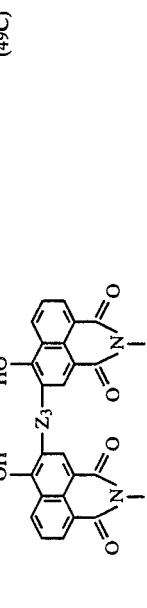
(48C)
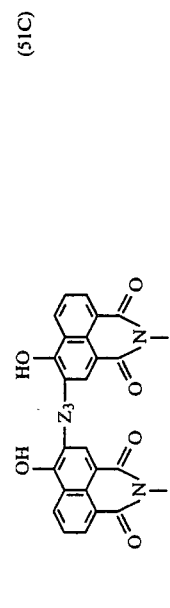
(50C)
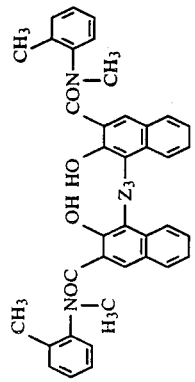
(41C)
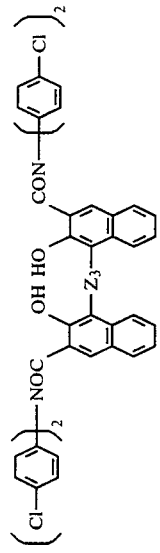
(43C)
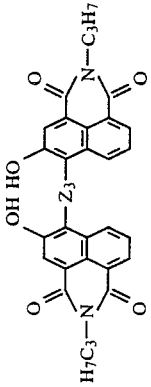
(45C)
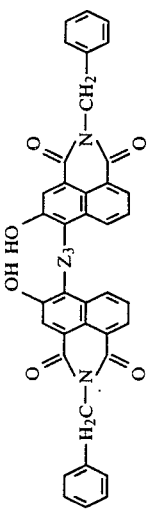
(47C)
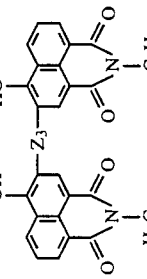
(49C)
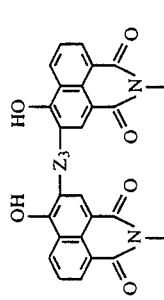
(51C)

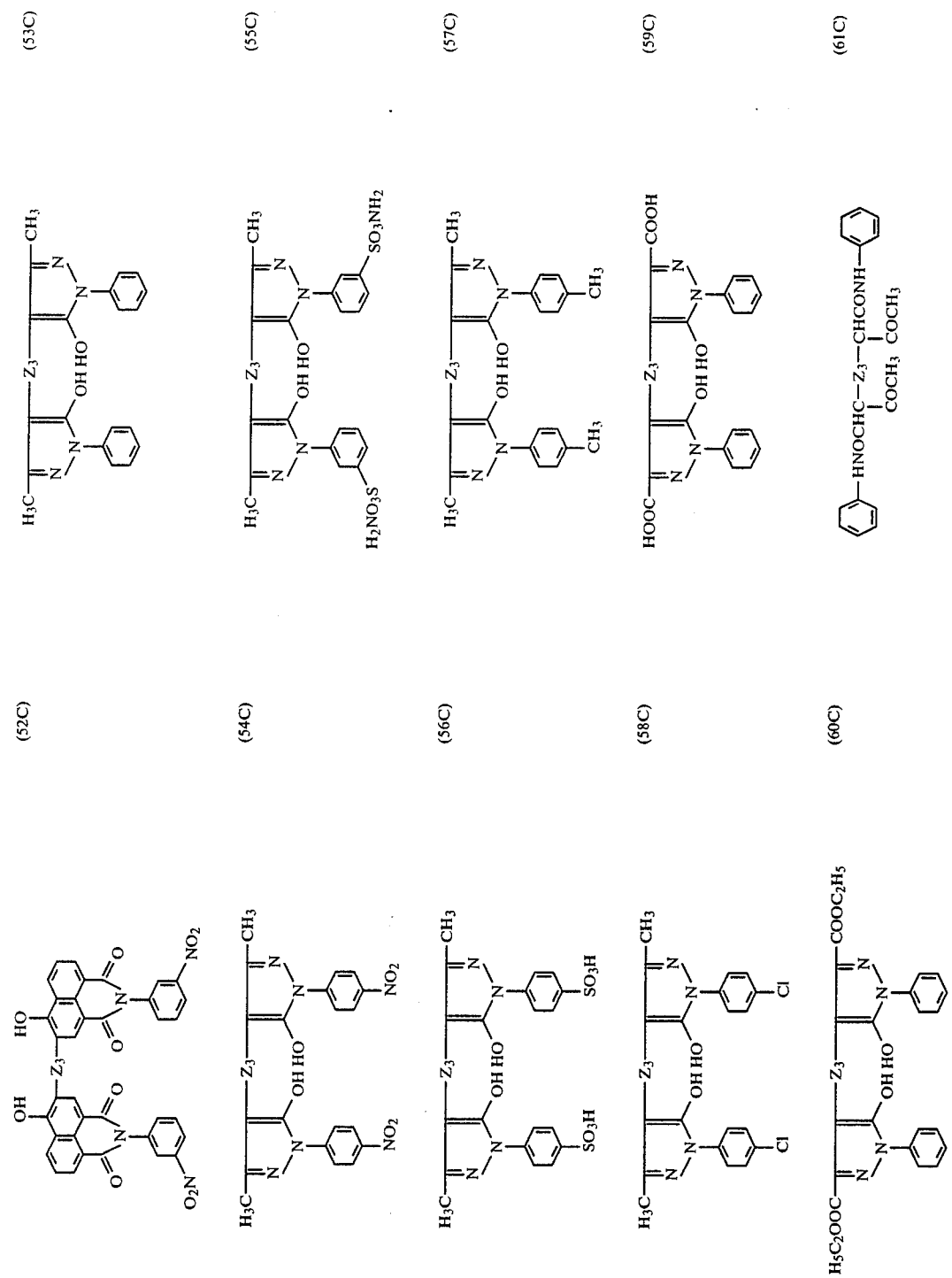

-continued
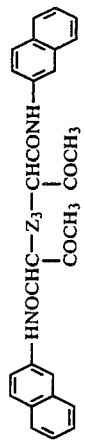 (62C)
 (63C)
 (64C)
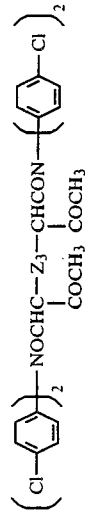 (65C)
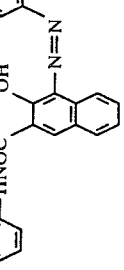 (66C)
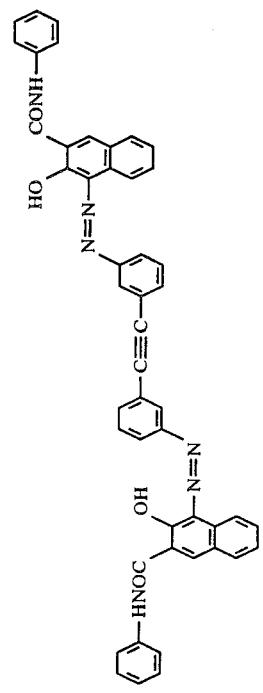 (1D)
—N=N— is represented by $Z_4$ in compounds 2D to 66D.
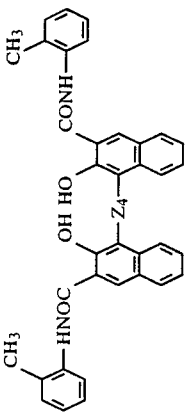 (2D)
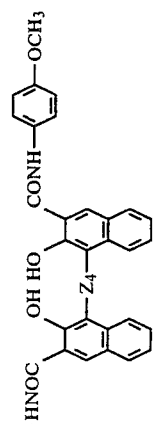 (3D)

-continued
(4D) 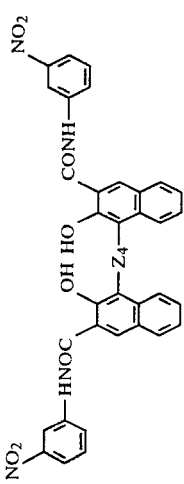
(5D) 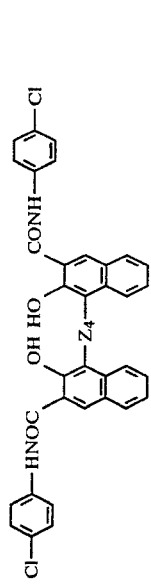
(6D) 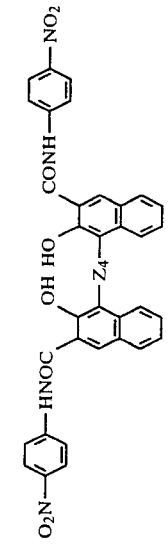
(7D) 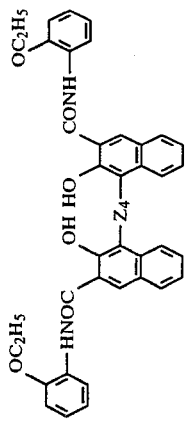
(8D) 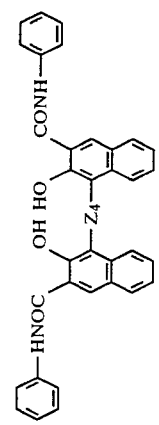
(9D) 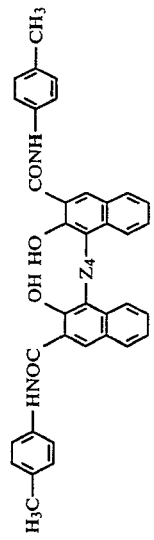
(10D) 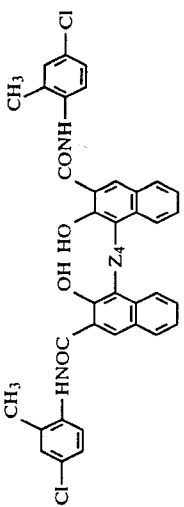
(11D) 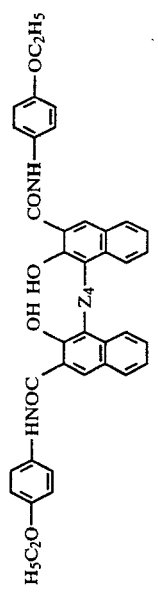
(12D) 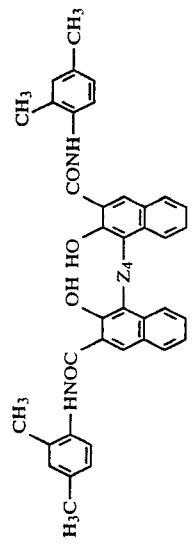
(13D) 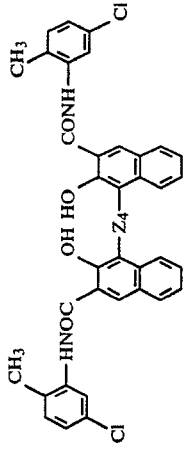

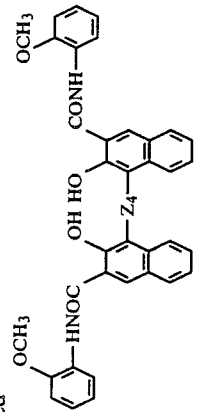 (14D)
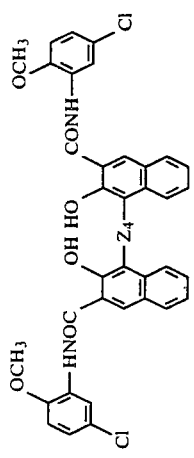 (15D)
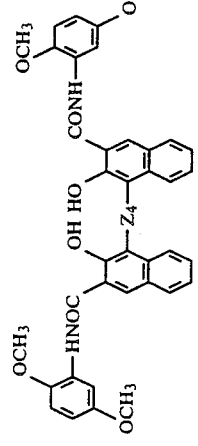 (16D)
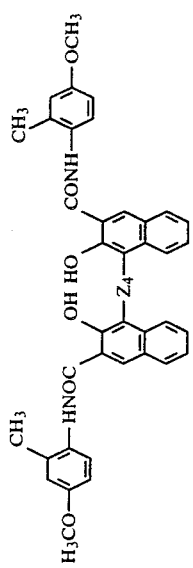 (17D)
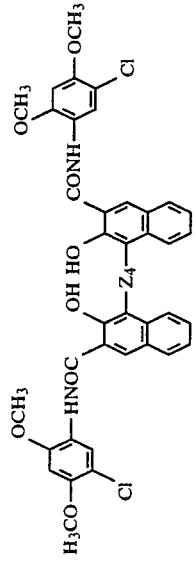 (18D)
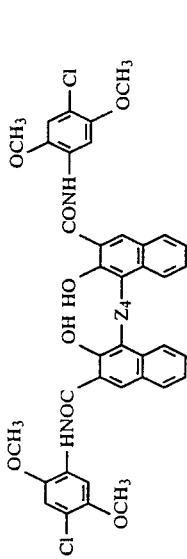 (19D)
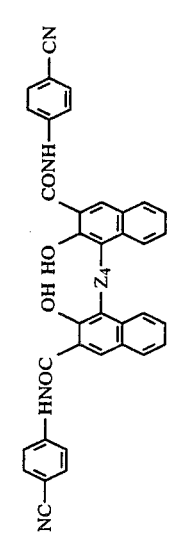 (20D)
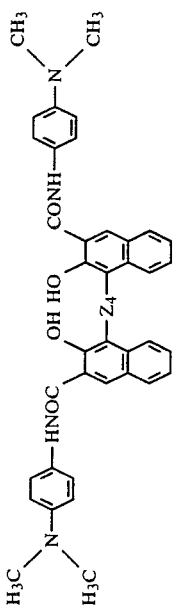 (21D)
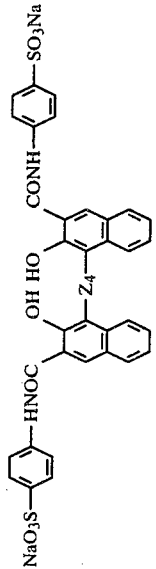 (22D)
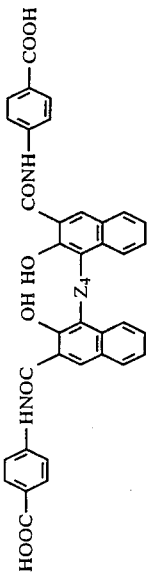 (23D)
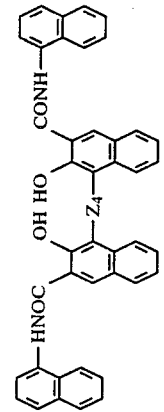 (24D)
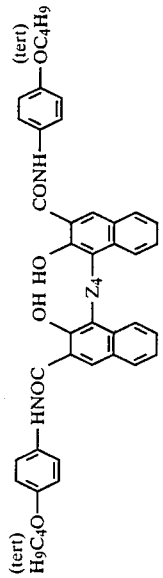 (25D)

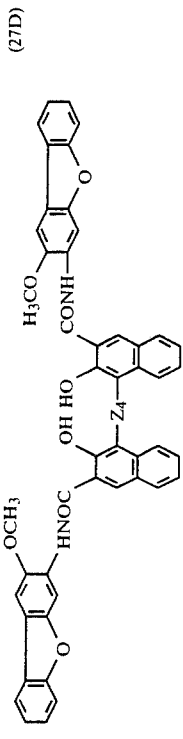 (26D)
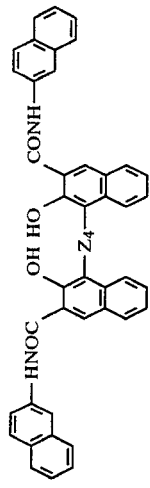 (27D)
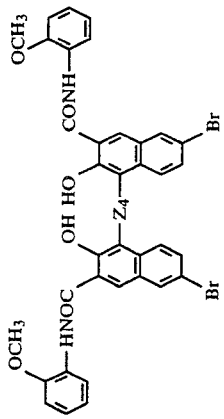 (28D)
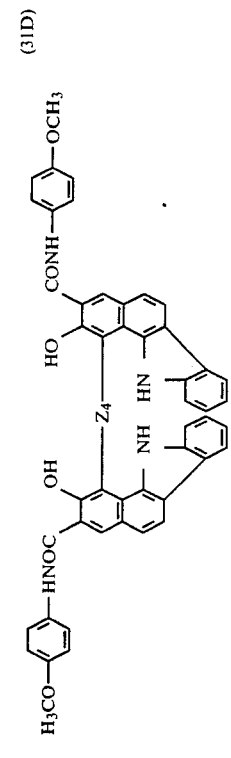 (29D)
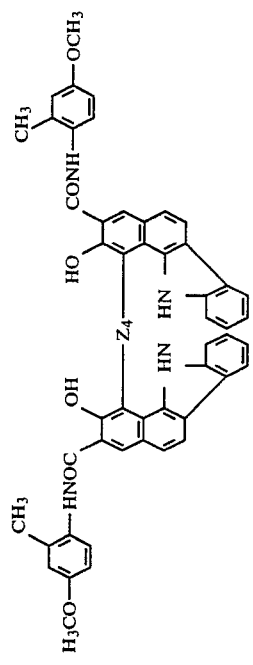 (30D)
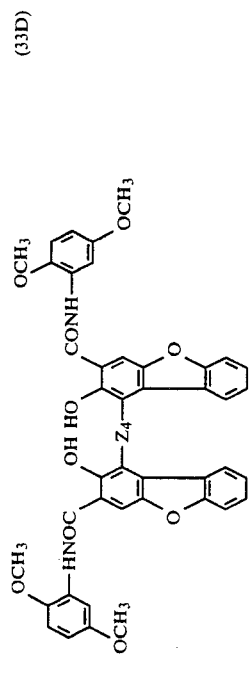 (31D)
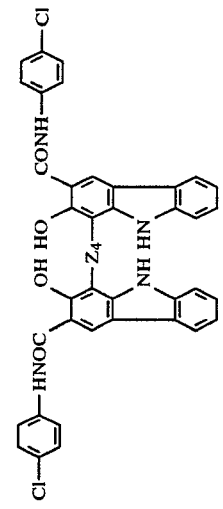 (32D)
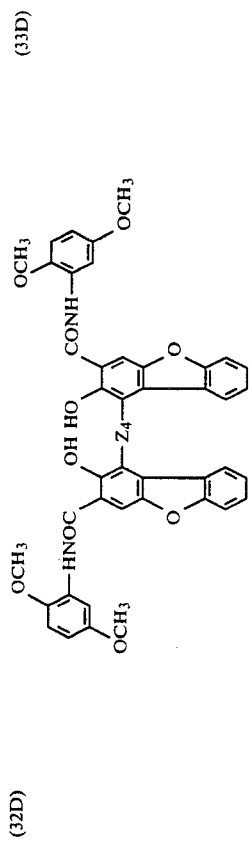 (33D)

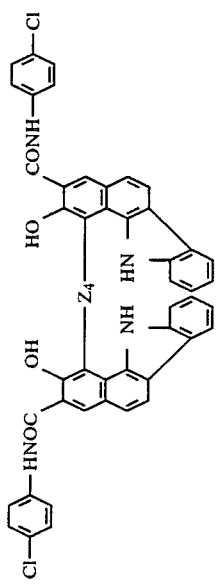
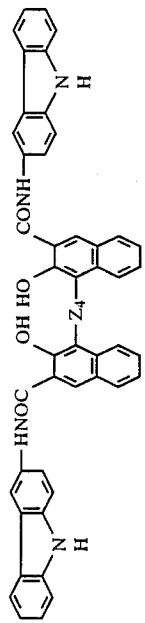
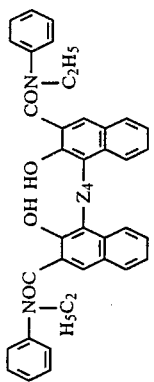
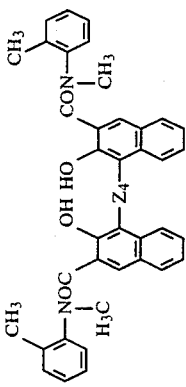
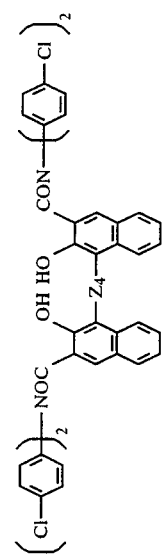
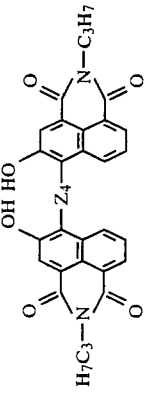
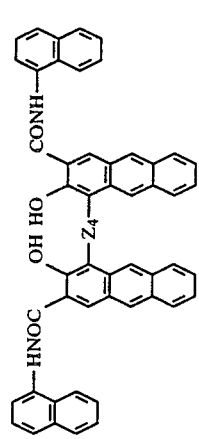
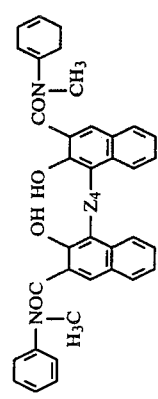
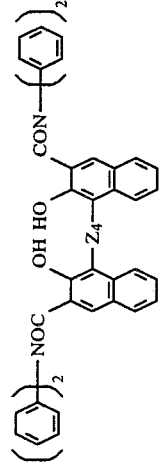
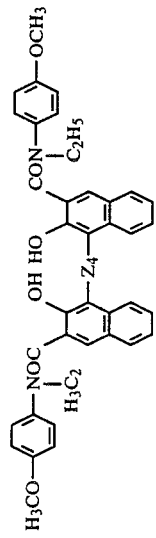
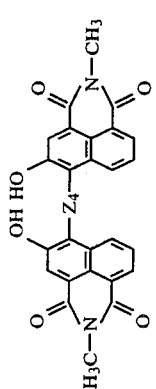
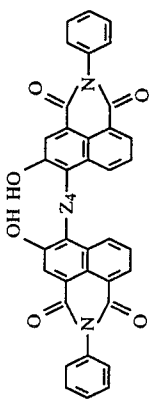

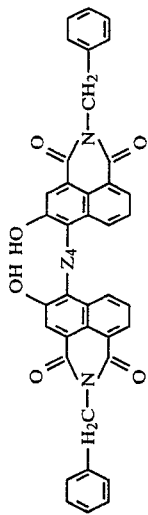 (46D)
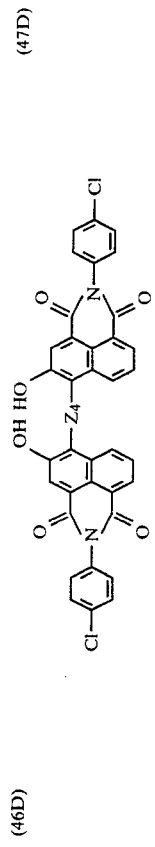 (47D)
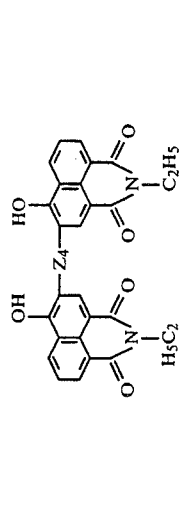 (48D)
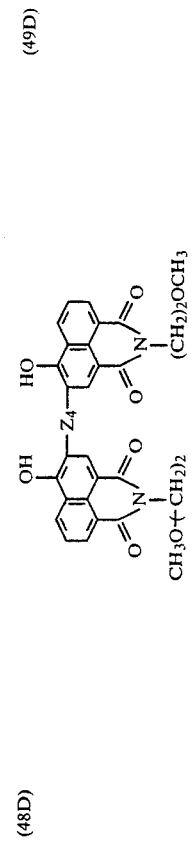 (49D)
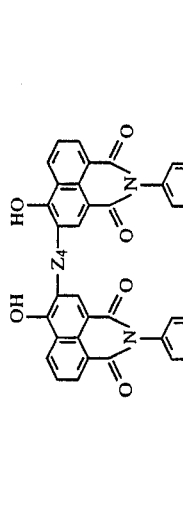 (50D)
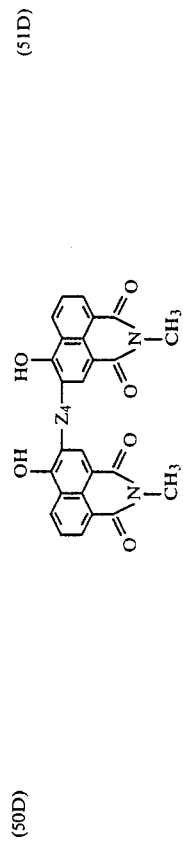 (51D)
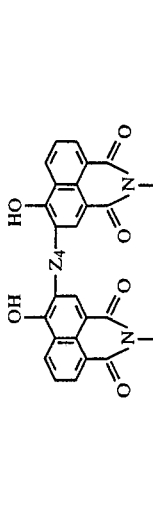 (52D)
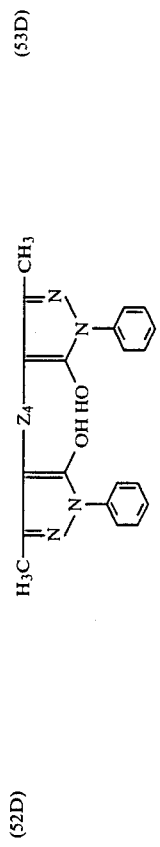 (53D)
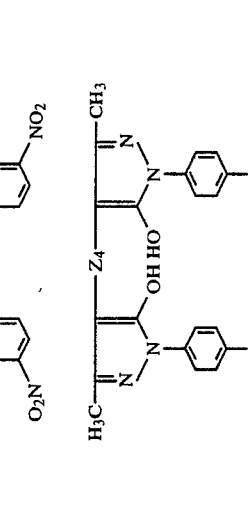 (54D)
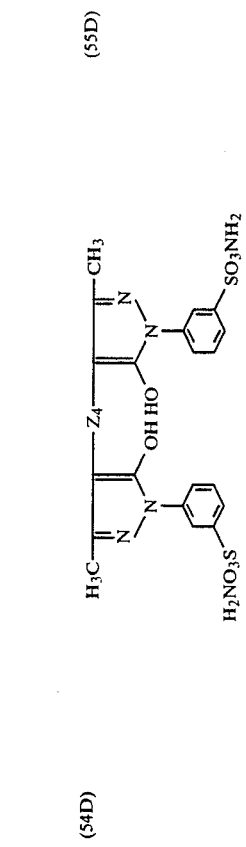 (55D)

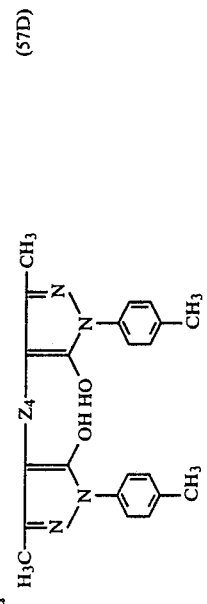 (56D)
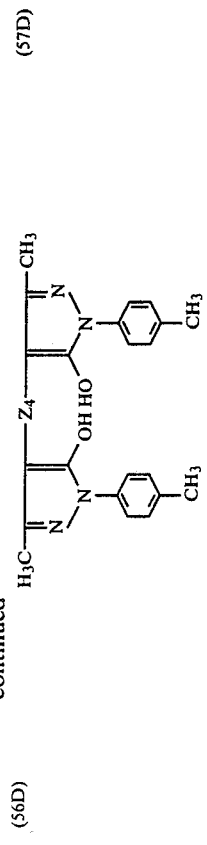 (57D)
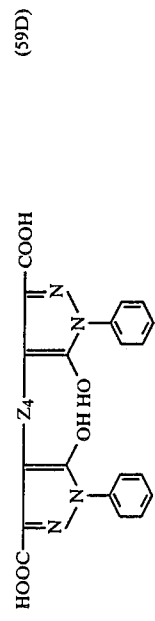 (58D)
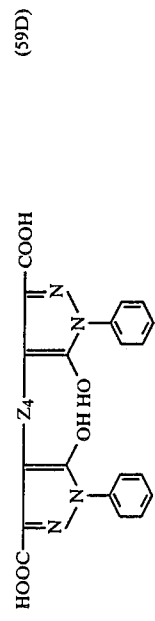 (59D)
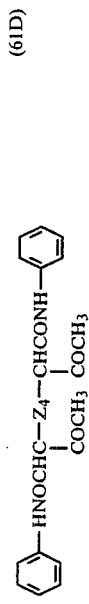 (60D)
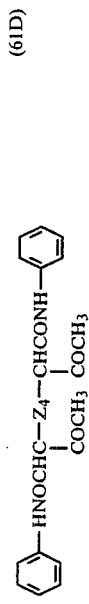 (61D)
 (62D)
 (63D)
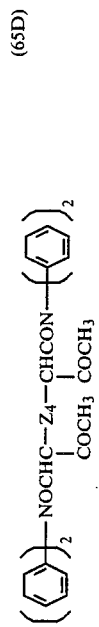 (64D)
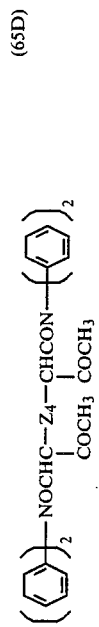 (65D)
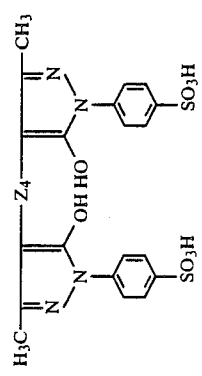 (66D)
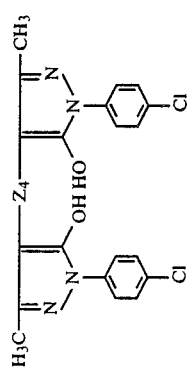
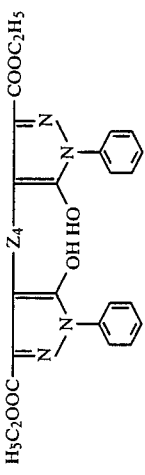
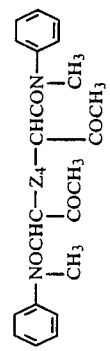

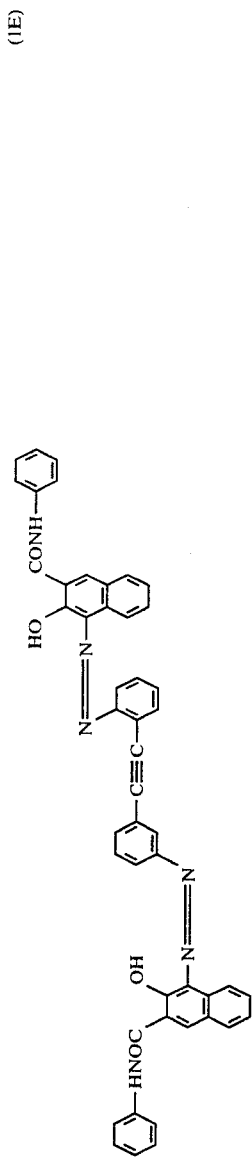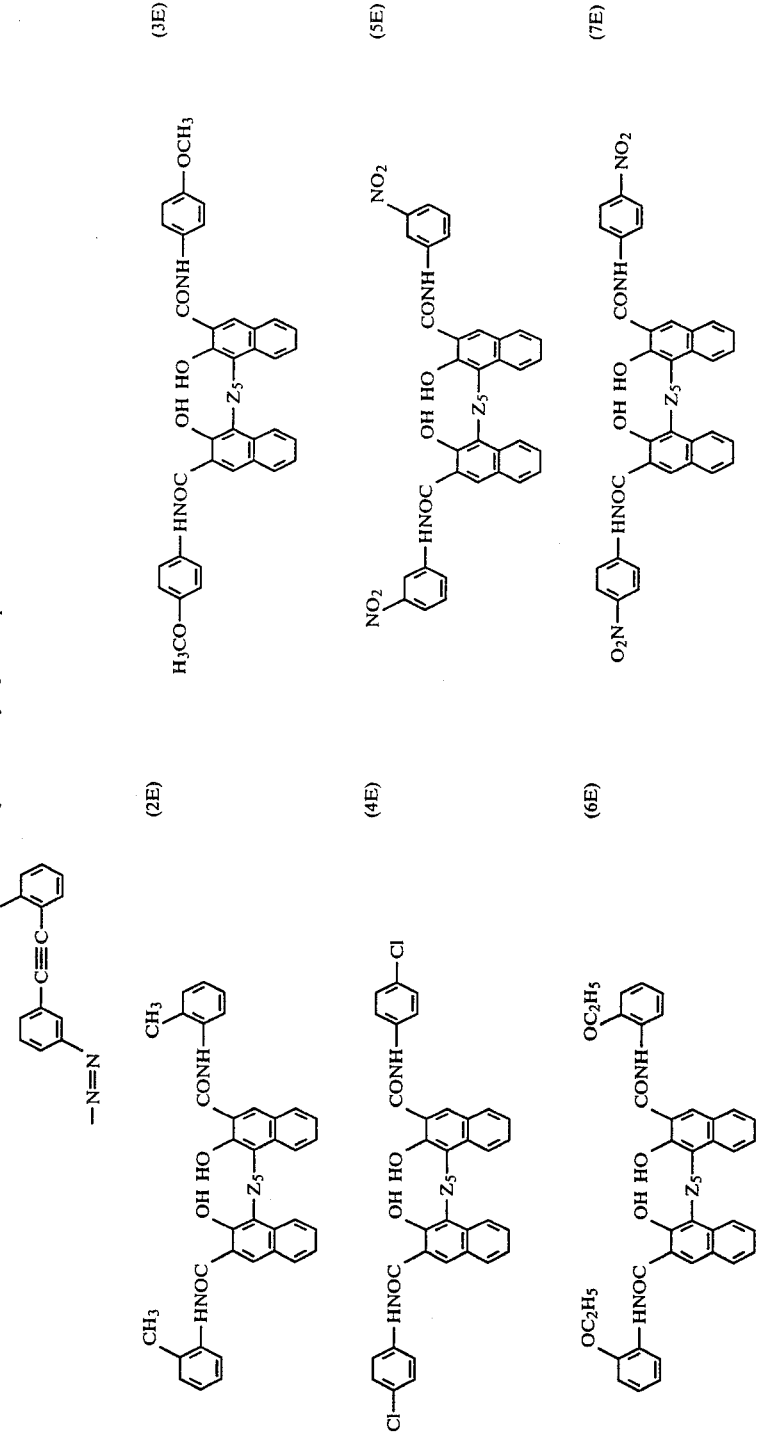

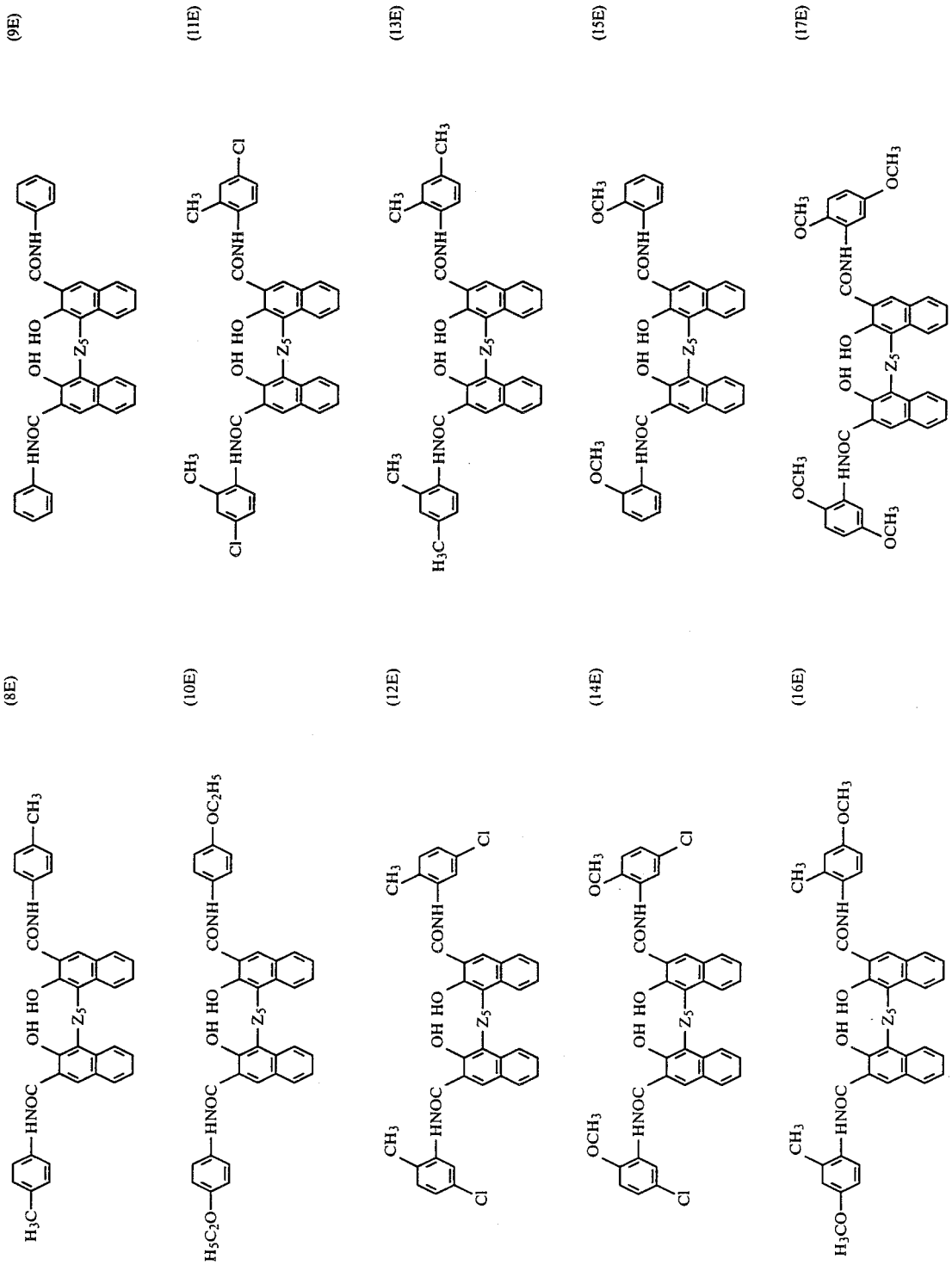

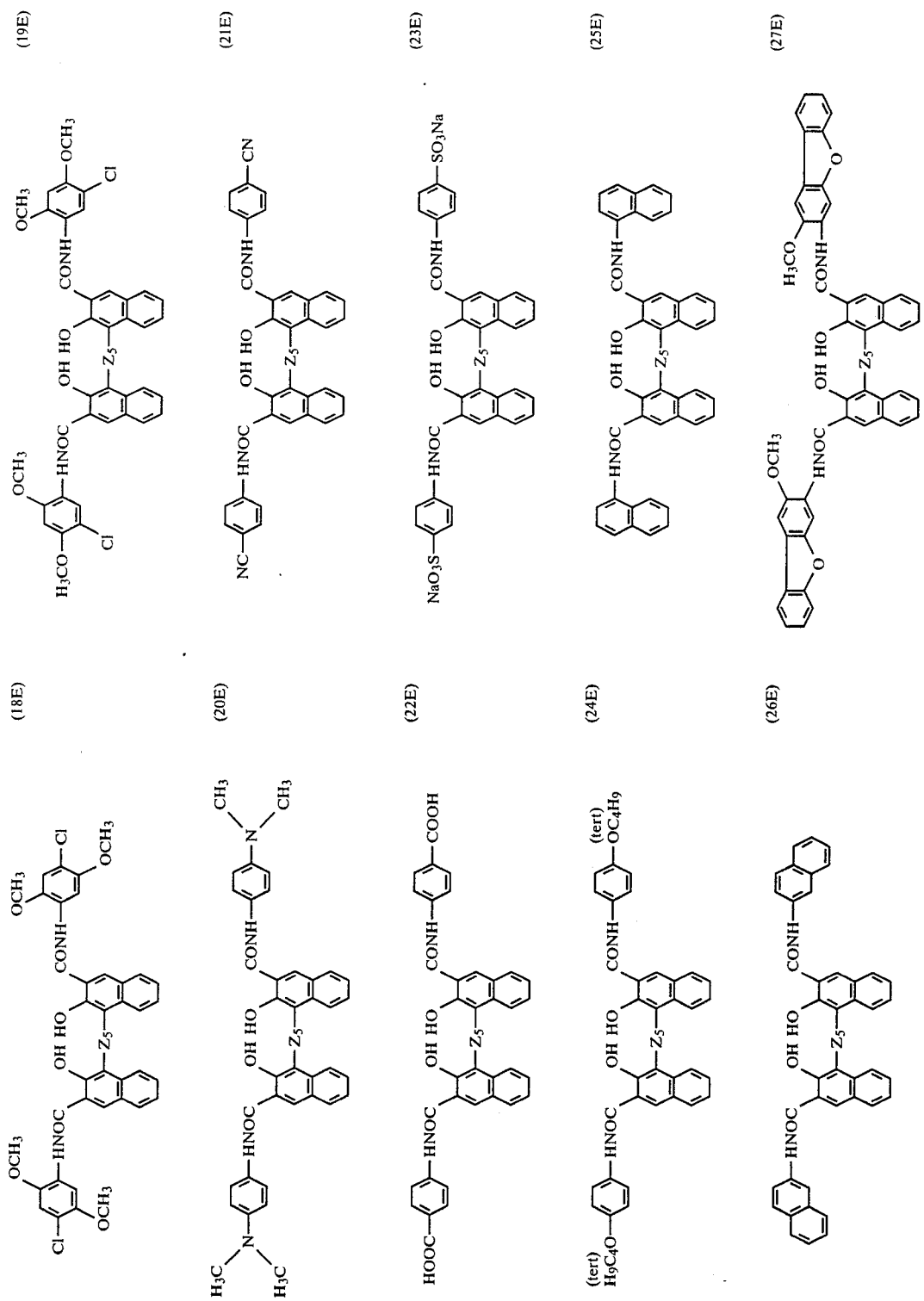

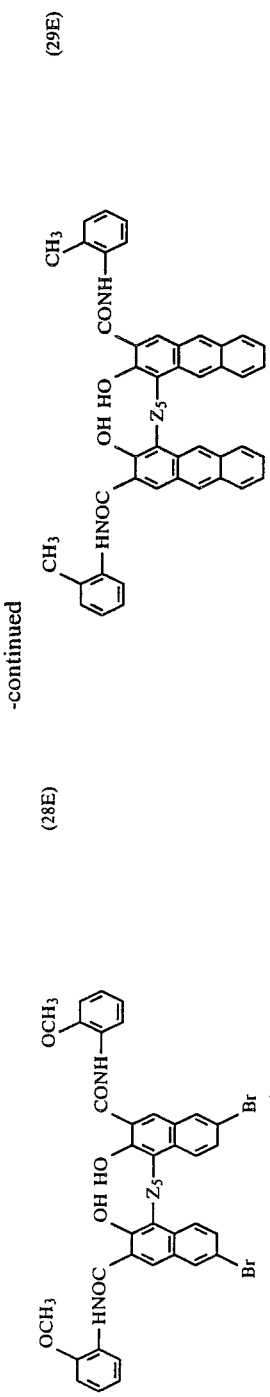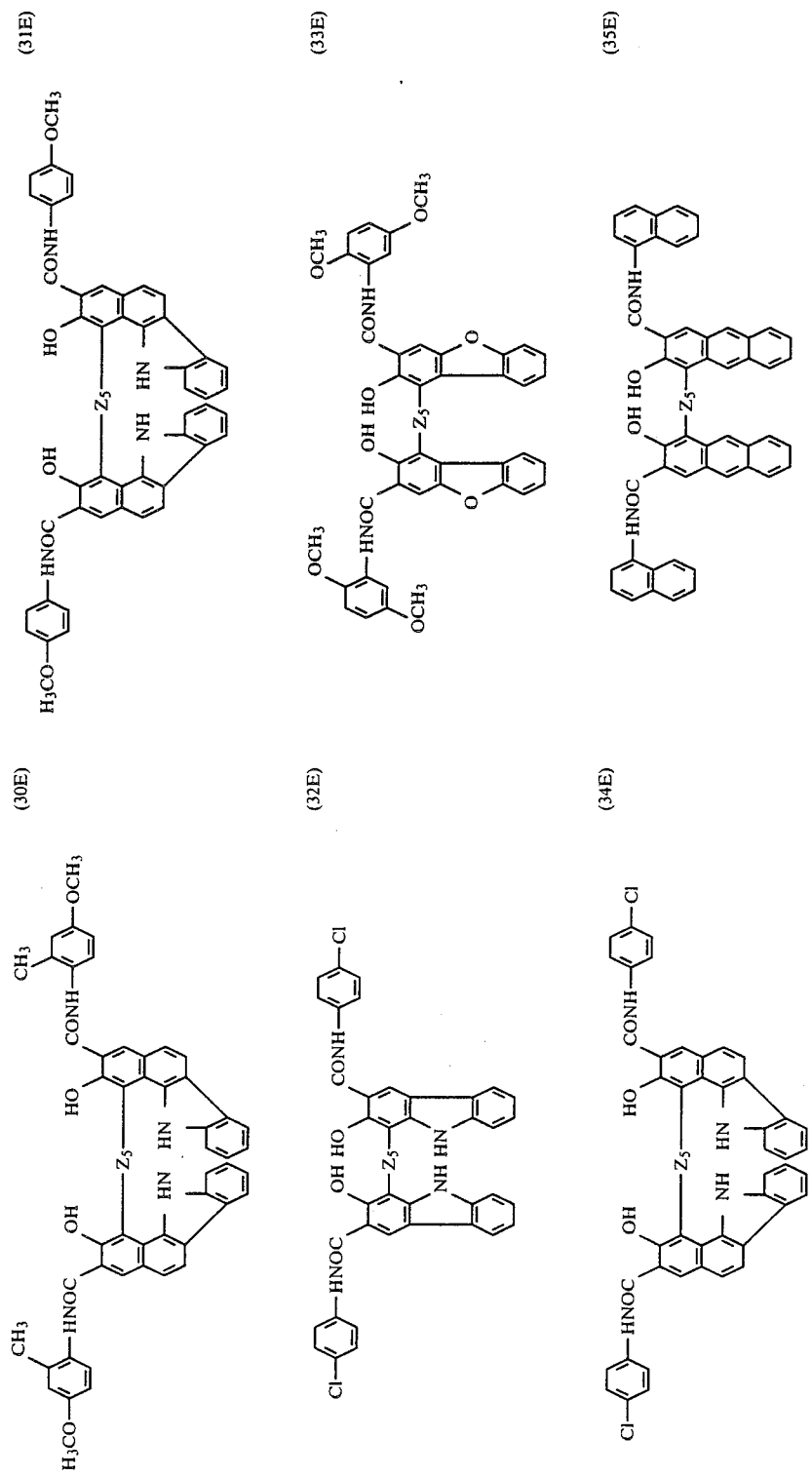

-continued
(48E) 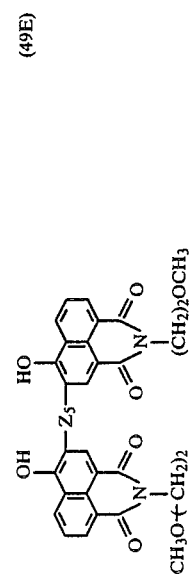 (49E) 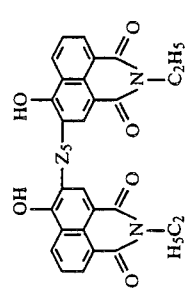
(50E) 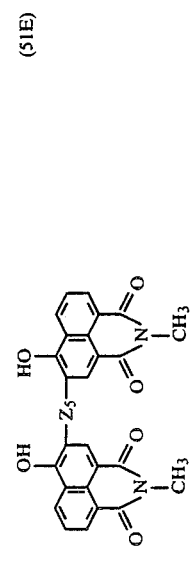 (51E) 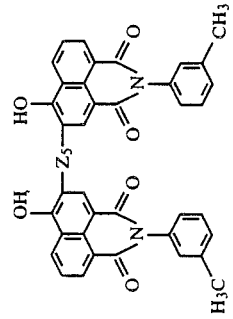
(52E) 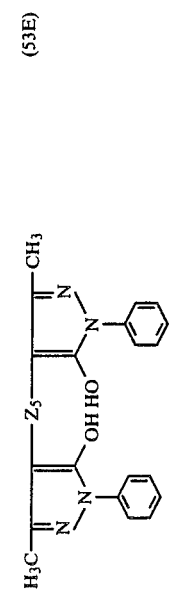 (53E) 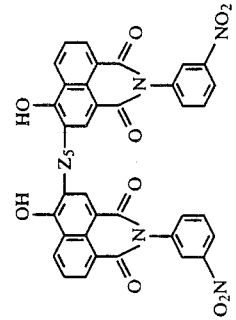
(54E) 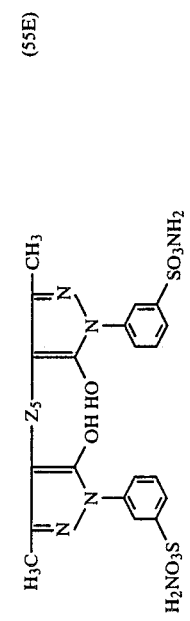 (55E) 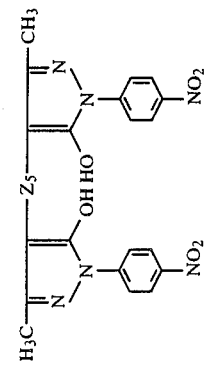
(56E) 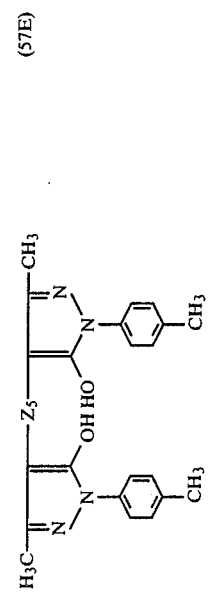 (57E) 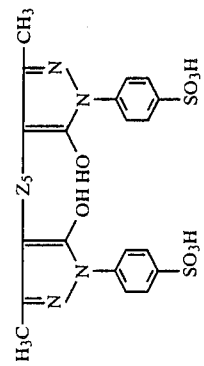

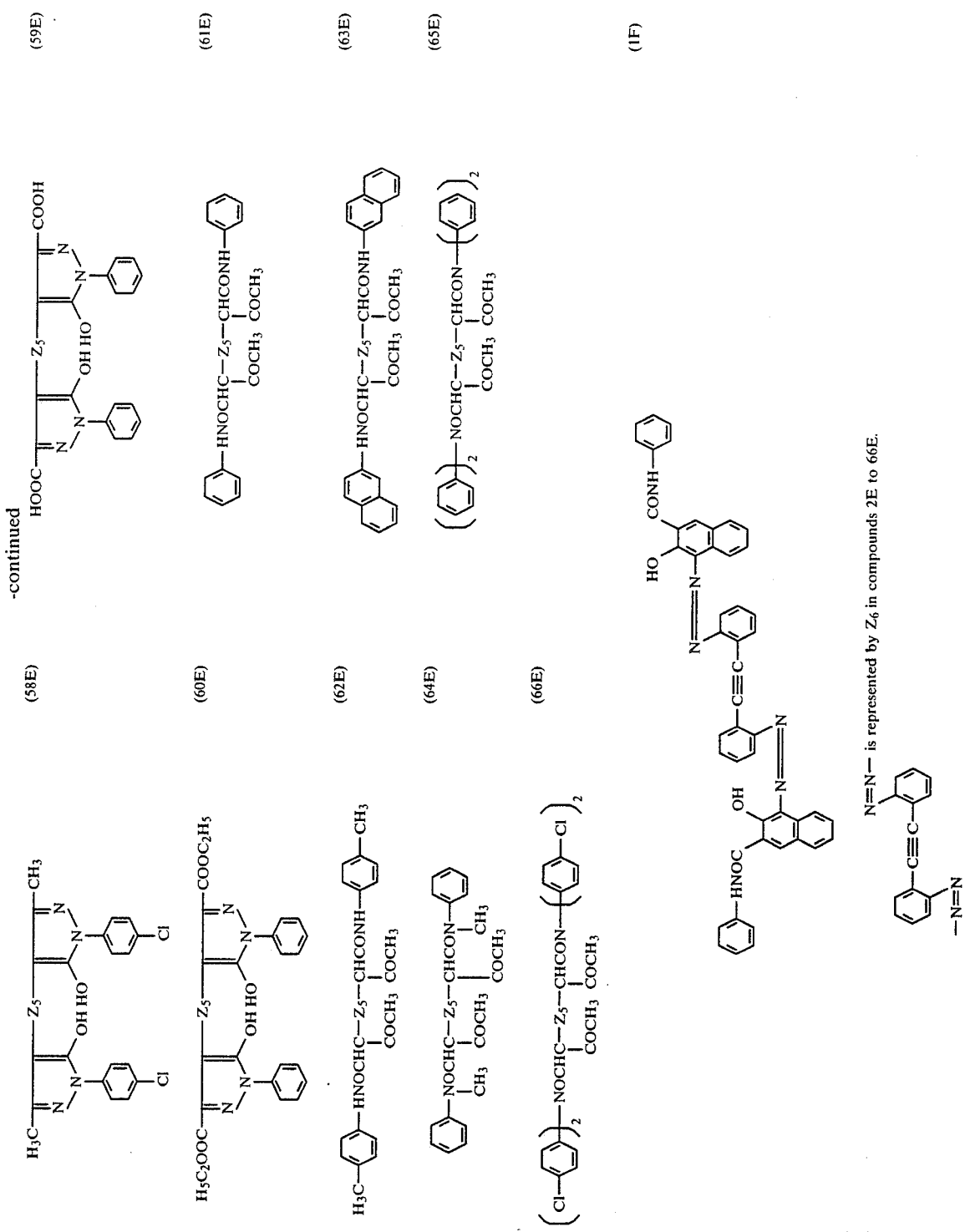

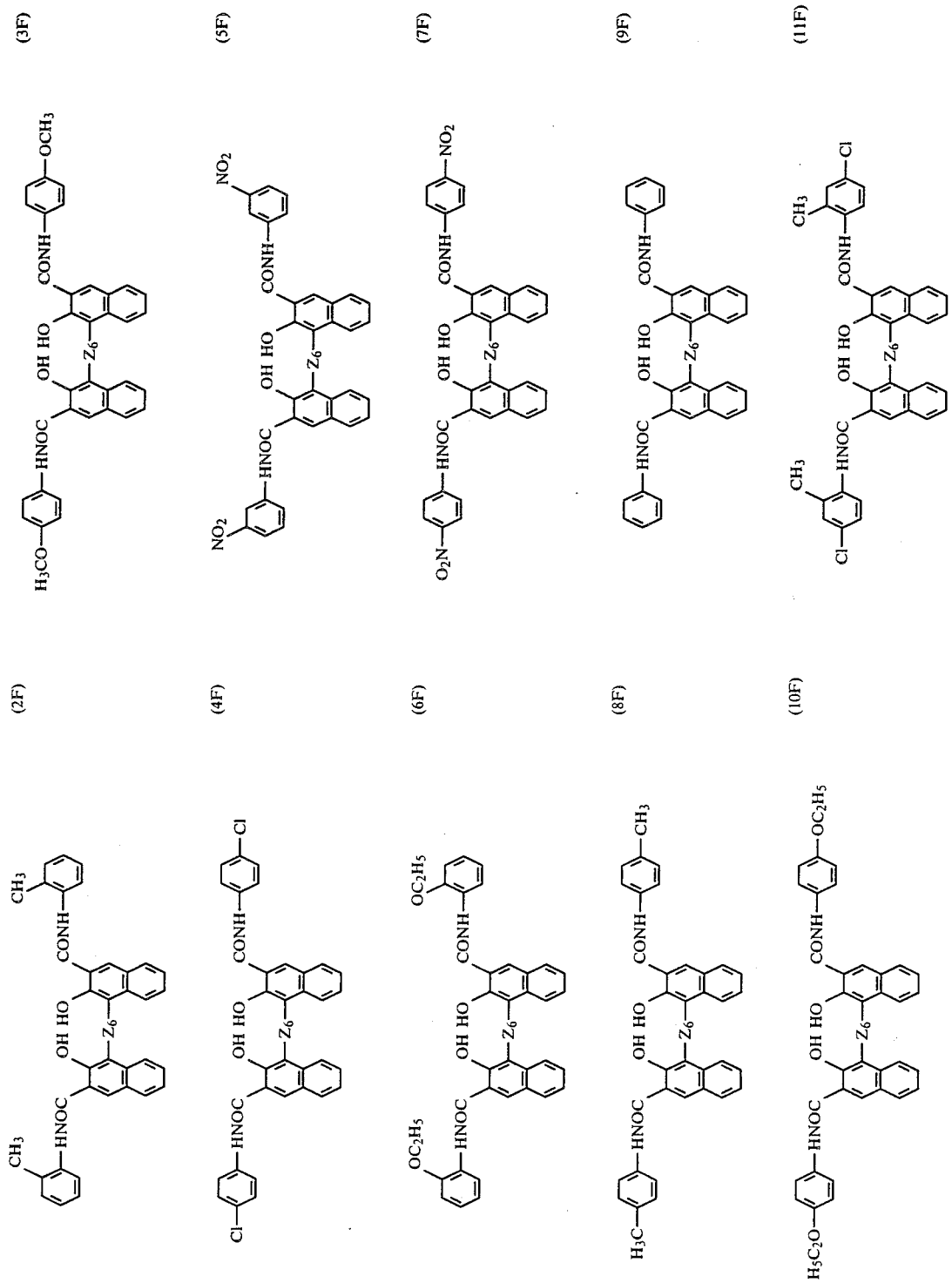

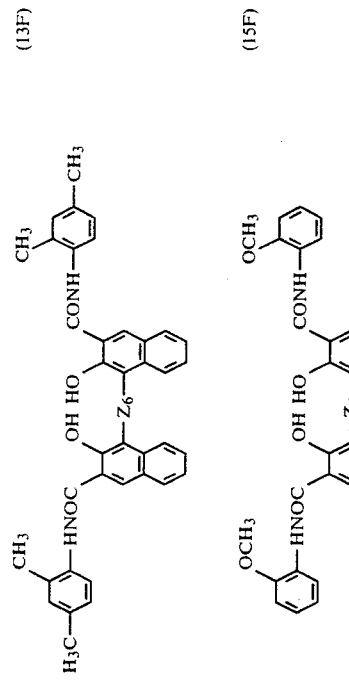
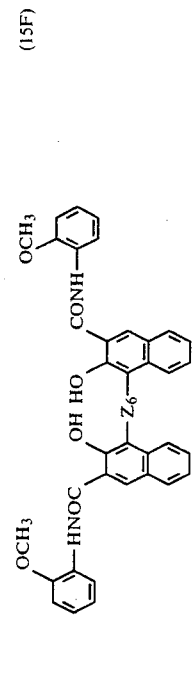
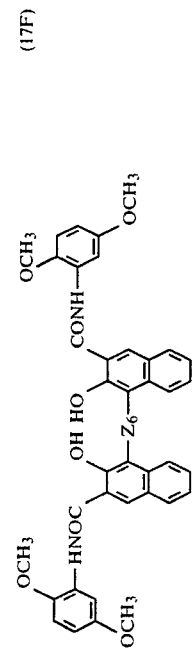
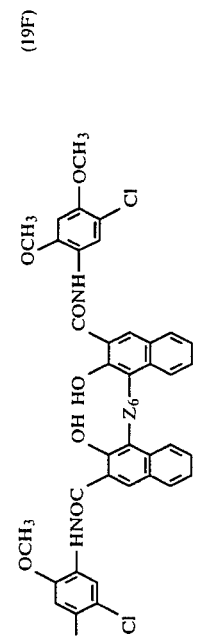
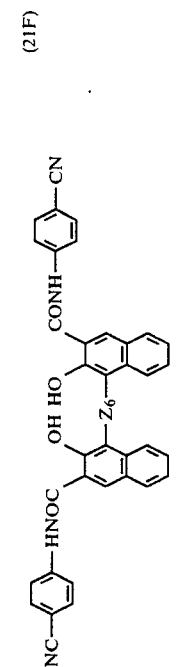
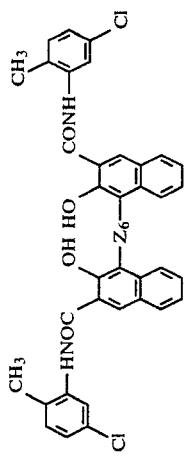
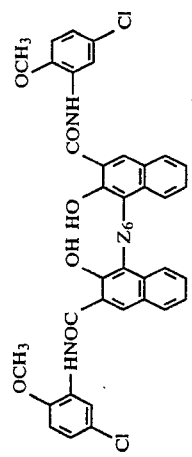
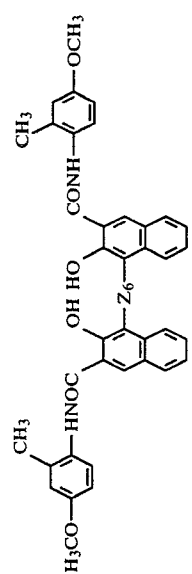
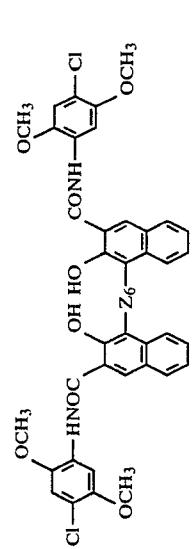
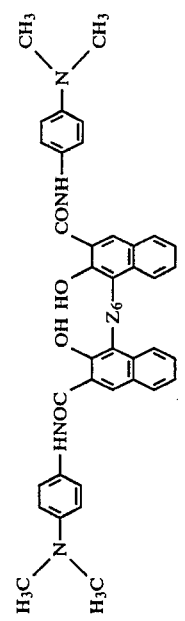

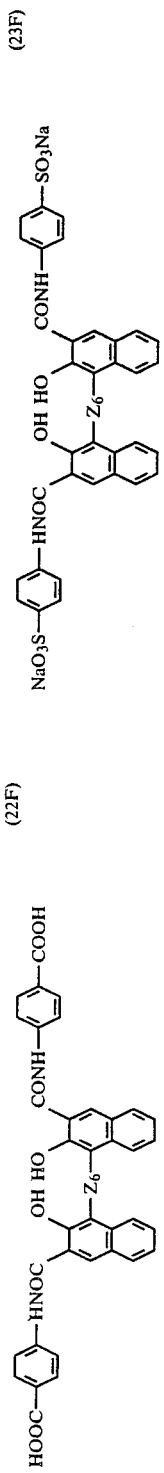
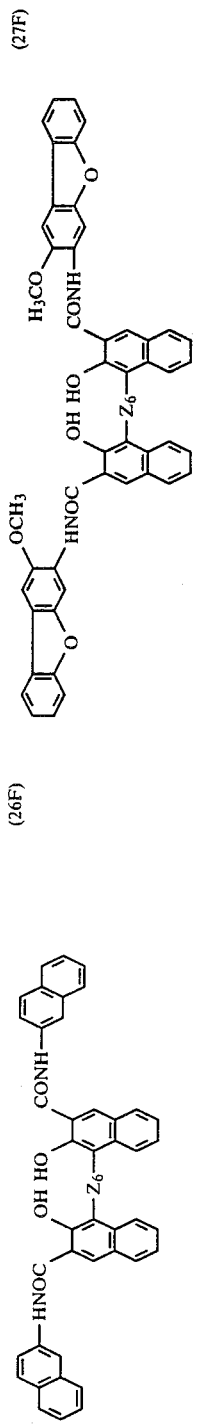
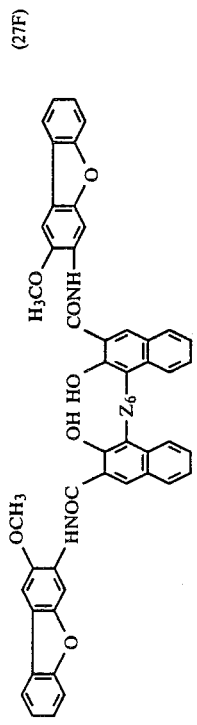
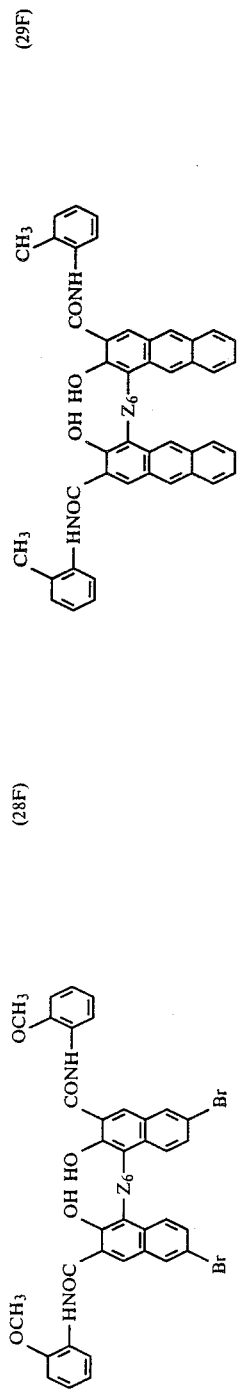
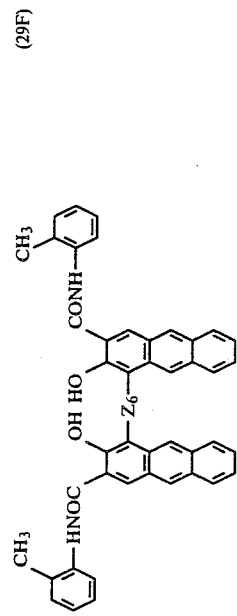
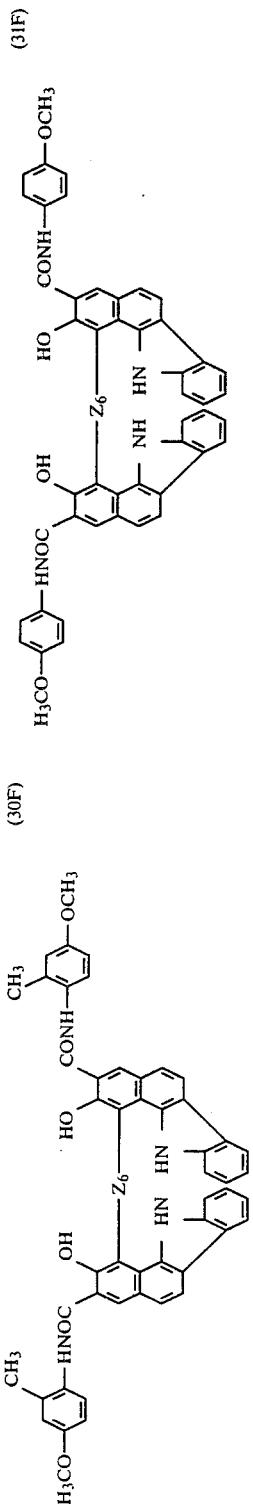
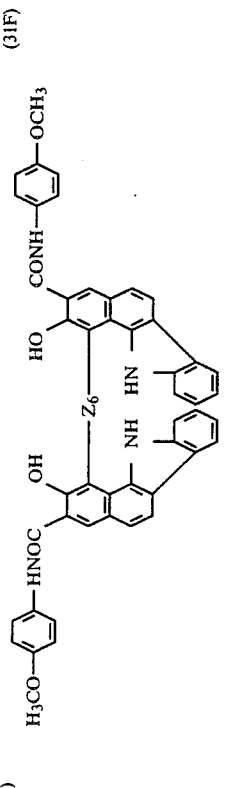

-continued
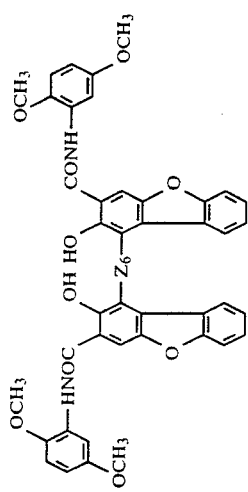 (33F)
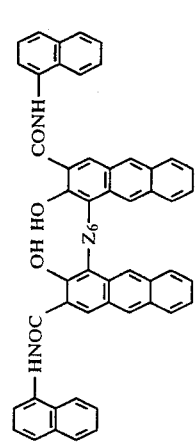 (35F)
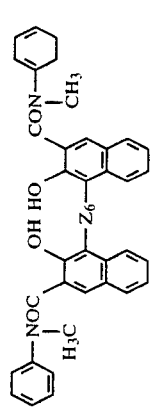 (37F)
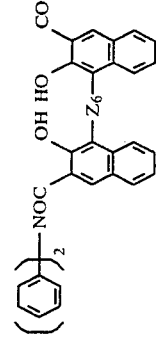 (39F)
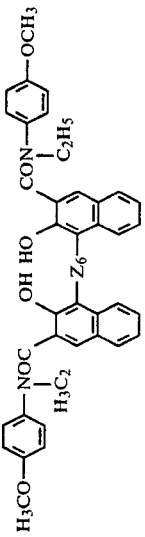 (41F)
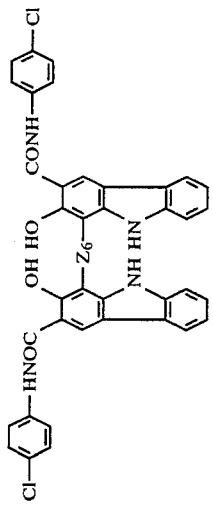 (32F)
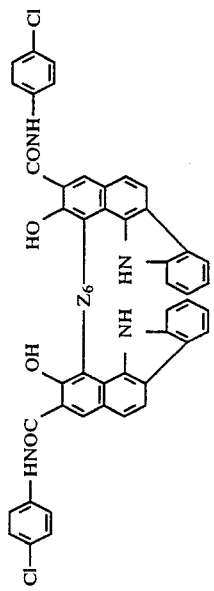 (34F)
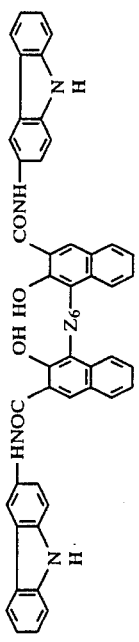 (36F)
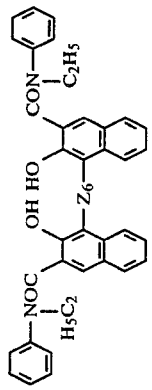 (38F)
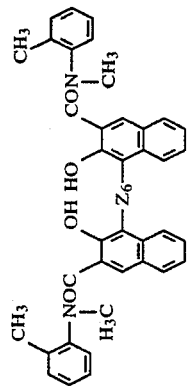 (40F)

-continued
(42F) 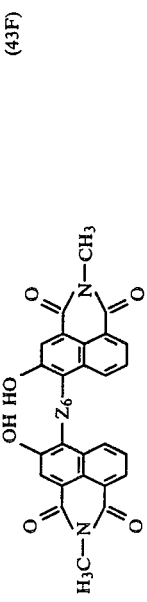 (43F) 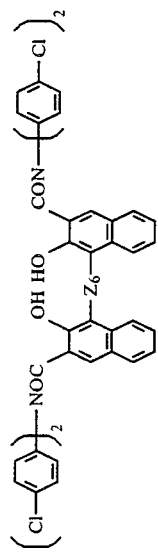
(44F) 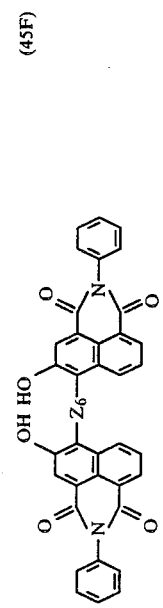 (45F) 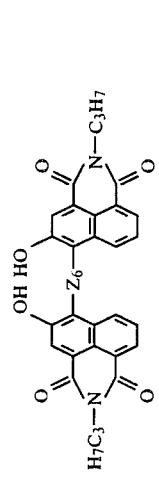
(46F) 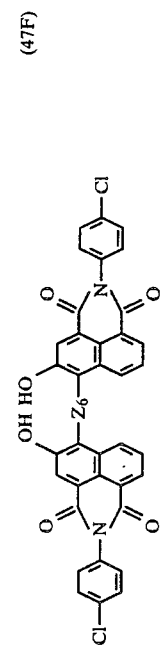 (47F) 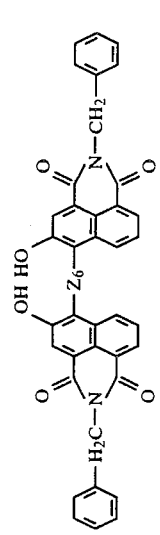
(48F) 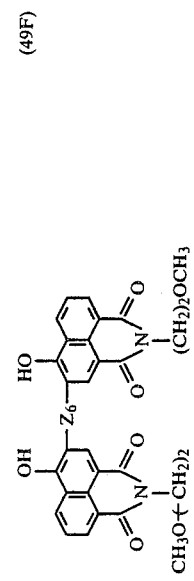 (49F) 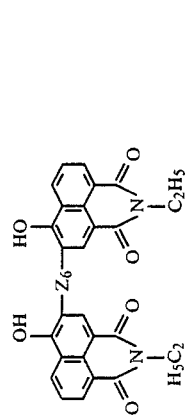
(50F) 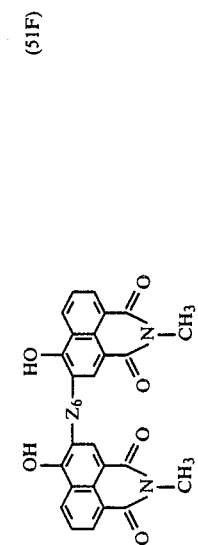 (51F) 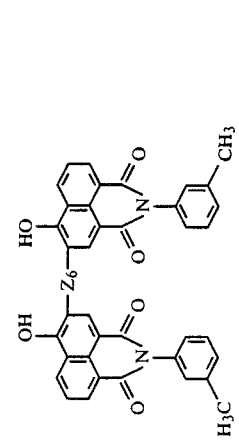

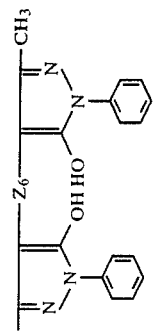
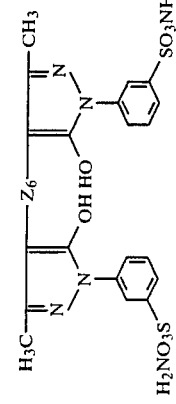
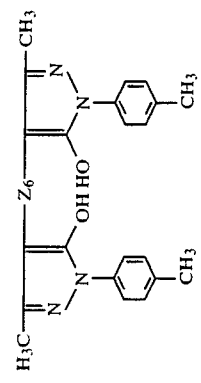
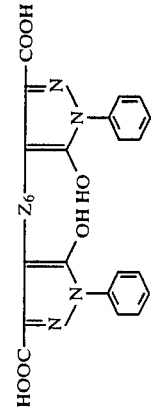
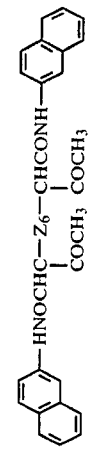
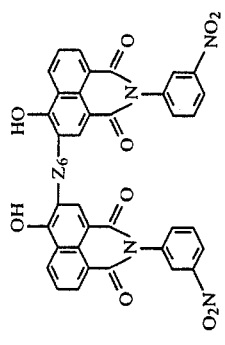
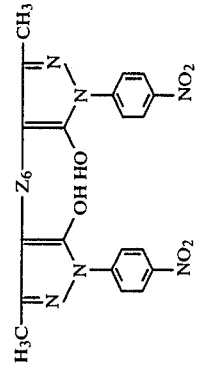
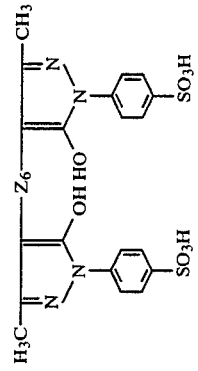
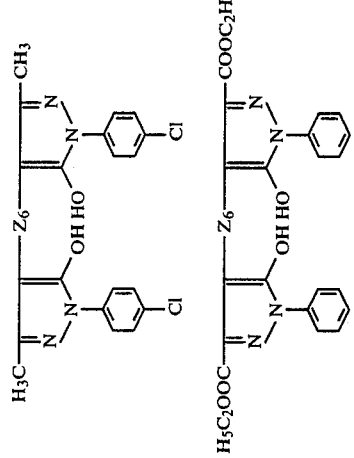

-continued
 (64F)
 (66F)
 (65F)

The disazo compounds of the present invention can be prepared in a conventional manner as shown in Scheme 1 below.

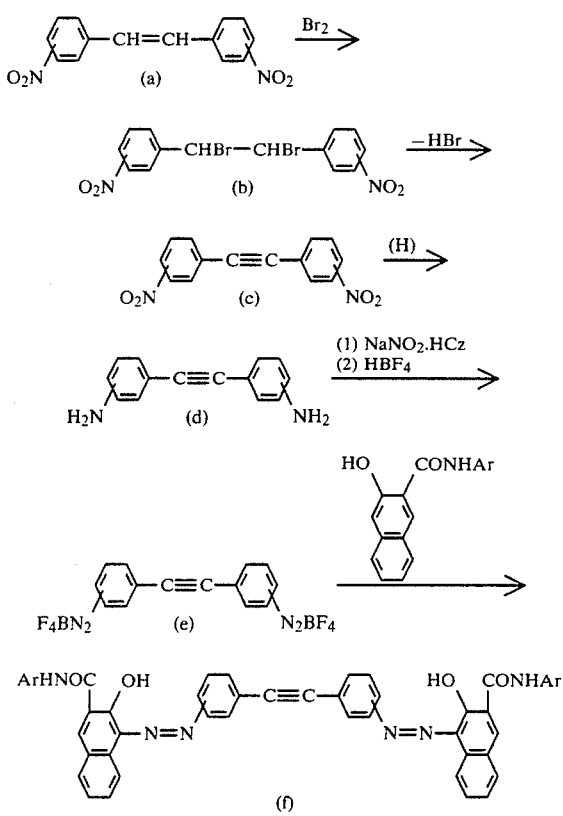

More specifically, dinitrostilbene (a) is subjected to a bromine addition reaction to form a dibromated derivative (b), which is reacted with a suitable base to form dinitrotolane (c). The nitro group in (c) is reduced to form diaminotolane (d), which is diazotized to form a bisdiazonium salt. The desired disazo compound can be readily produced by subjecting the isolated bisdiazonium salt to a coupling reaction in a suitable organic solvent, i.e., N,N-dimethylformamide with a compound corresponding to the above described dye (e.g., naphthol AS and other couplers) in the presence of an alkali. For example, disazo compound (1A) can be produced according to the method described in Preparation 1.

The synthesis of some of the disazo compounds according to the present invention is hereunder described in detail.

Preparation 1

According to the method described in P. Ruggli & F. Lang, Helv. Chim. Acta 21, 38 (1938), 4,4'-dinitrostilbene was converted to 4,4'-diaminotolane. The product (17.5 g) was added to dilute hydrochloric acid (40 ml concentrated HCl and 100 ml $H_2O$) and the mixture was well stirred on a water bath (60° C.) for about 30 minutes. The resulting mixture was cooled to 0° C., and a solution obtained by dissolving sodium nitrite (12.2 g) in water (50 ml) was added dropwise to the cooled mixture at 0° C. over a period of about 30 minutes. Thereafter, the mixture was stirred at 0° C. for one hour, and a small amount of the unreacted product was filtered out. To the filtrate, 42% borofluoric acid (50 ml) was added and the resulting crystal was recovered by filtration. The crystal was washed with a small amount of cold water and dried to provide a red crystal of bisdiazonium fluoroborate in an amount of 28.2 g (yield: 83%).

The bisdiazonium salt (2.4 g) and 2-hydroxy-3-naphthoic acid anilide (3.12 g) were dissolved in N,N-dimethylformamide (120 ml). To the resulting solution, a solution consisting of sodium acetate (4 g) and water (20 ml) was added dropwise at 0° C. over a period of about 20 minutes, and the mixture was stirred at room temperature for about 2 hours. The resulting precipitate was recovered by filtration, washed first with water (500 ml), then with N,N-dimethylformamide (500 ml) under stirring. Finally, the precipitate was washed with ethanol and dried to provide a disazo pigment (compound 1A) in an amount of 3.95 g (yield: 89%). Decomposition temperature: higher than 300° C. or more.

Elemental analysis Calculated (for $C_{48}H_{32}O_4N_6$): C 76.18%, H 4.26%, N 11.10% Found: C 76.22%, H 4.20%, N 11.35%

IR adsorption spectrum (KBr Tab.)
Amide: 1670 cm$^{-1}$
Visible spectrum (in $CH_2Cl_2$)
$\lambda$max: 554 nm Preparations 2 to 8

Disazo compounds (2A), (3A), (5A), (13A), (15A), (25A) and (26A) were synthesized in the same manners as Preparation 1 except that the compounds listed in Table 1 were used as couplers. The decomposition temperature, elemental analysis, IR spectrum and visible spectrum for the resulting disazo compounds are given in Table 1.

TABLE 1

| Synthesis Example | Coupler | Disazo Compound (decomposing temp.) | Elemental Analysis Calcd. (%) | Found (%) | IR Absorption Spectrum $\nu_{c=o}$ cm$^{-1}$ (KBr Method) | $\lambda$max: nm (in dichloro-methane) |
|---|---|---|---|---|---|---|
| 2 | HO CONH—⟨CH₃⟩ | (2A) (higher than 300° C.) | C 76.52 H 4.62 N 10.71 | 76.72 4.52 10.80 | 1670 | 551 |

TABLE 1-continued

| Synthesis Example | Coupler | Disazo Compound (decomposing temp.) | Elemental Analysis Calcd. (%) | Found (%) | IR Absorption Spectrum $v_{c=o}$ cm$^{-1}$ (KBr Method) | λmax: nm (in dichloromethane) |
|---|---|---|---|---|---|---|
| 3 | 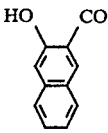 | (3A) (higher than 300° C.) | C 73.52<br>H 4.44<br>N 10.29 | 73.86<br>4.34<br>10.47 | 1665 | 555 |
| 4 | 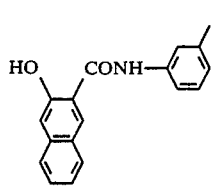 | (5A) (higher than 300° C.) | C 68.08<br>H 3.57<br>N 13.23 | 68.14<br>3.61<br>13.47 | 1675 | 545 |
| 5 | 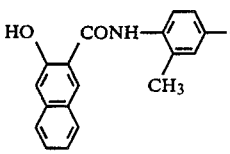 | (13A) (higher than 300° C.) | C 76.83<br>H 4.96<br>N 10.34 | 76.97<br>5.24<br>10.69 | 1670 | 556 |
| 6 | 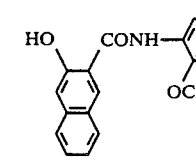 | (15A) (higher than 300° C.) | C 73.52<br>H 4.44<br>N 10.29 | 73.40<br>4.27<br>10.14 | 1660 | 550 |
| 7 | 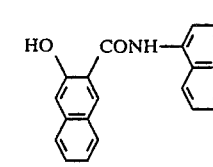 | (25A) (higher than 300° C.) | C 78.49<br>H 4.23<br>N 9.81 | 78.31<br>4.23<br>9.50 | 1675 | 550 |
| 8 | 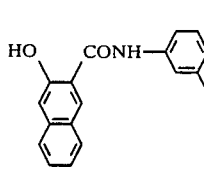 | (26A) (higher than 300° C.) | C 78.49<br>H 4.23<br>N 9.81 | 78.31<br>4.29<br>9.91 | 1670 | 557 |

The infrared spectrum (KBr method) of disazo compound (13A) is shown in the FIGURE.

Other disazo compounds can also be synthesized in a manner similar to the foregoing synthesis examples except for changing the coupler and the starting material dinitrostilbene.

The electrophotographic light sensitive element in accordance with the present invention comprises an electrophotographic light sensitive layer containing at least one of the disazo compounds represented by the general formula described above. A variety of electrophotographic light sensitive elements are known. The electrophotographic light sensitive elements of the present invention may be of any type but generally have a structure of the following type.

(1) A structure comprising a conductive support having provided thereon an electrophotographic light sensitive layer comprising dispersing a disazo compound in a binder or a charge transporting medium.

(2) A structure comprising conductive suport having provided thereon a charge generating layer comprising a disazo compound as a main ingredient and further thereon a charge transporting medium layer.

The disazo compound of the present invention acts as a photoconductive substance and, upon absorption of light, generates charge carriers with extremely high efficiency. The generated charges can also be transported using the disazo compound as a medium but it is more effective to transport the charges using a charge transporting compound as a medium.

To prepare the electrophotographic light sensitive element of type (1), finely divided disazo compound particles are dispersed in a binder solution or a solution in which a charge transporting compound and a binder are dissolved and the dispersion is coated on a conductive support followed by drying. The thickness of the electrophotographic light sensitive layer is in the range of 3 to 30 μm, preferably 5 to 20 μm.

To prepare the electrophotographic light sensitive element of type (2), the disazo compound is vacuum deposited on a conductive support, or a solution of the disazo compound in a solvent such as amines, etc. is coated on a conductive support, or a dispersion which is produced by dispersing finely divided disazo compound particles in a suitable coating solvent, if necessary and desired, in a solution in which a binder is dissolved is coated on a conductive support followed by drying and thereafter, a solution containing a charge transporting compound and a binder is coated thereon followed by drying. The thickness of the disazo compound layer which constitutes a charge generating layer is 4 $\mu$m or less, preferably less than 2 $\mu$m and the thickness of the charge transporting medium layer is in the range of 3 to 30 $\mu$m, preferably 5 to 20 $\mu$m.

The disazo compound used in the electrophotographic light sensitive elements of types (1) and (2) is employed after grinding to a particle diameter of 5 $\mu$m or less, preferably 2 $\mu$m or less with a dispersing machine such as a ball mill, a sand mill, a shaking mill, etc.

If the amount of the disazo compound employed in the electrophotographic light sensitive element of type (1) is too small, sensitivity is poor; if the amount is excessively large, charging ability and strength of the electrophotographic light sensitive layer is poor. The proportion of the disazo compound in the electrophotographic light sensitive layer is generally from 0.01 to 2 times by weight, preferably 0.05 to 1 times by weight, based on the weight of a binder. The proportion of the charge transporting compound which is incorporated if necessary and desired, is in the range of 0.1 to 2 times by weight, preferably 0.3 to 1.3 time by weight, based on the weight of binder. When the charge transporting compound is per se usable as a binder, it is preferred that the amount of the disazo compound to be added is in the range of 0.01 to 0.5 time by weight, based on the weight of a binder.

When a layer containing the disazo compound which constitutes a charge generating layer in the electrophotographic light sensitive element of type (2) is coated and formed, it is preferred that the amount of the disazo compound to be used is not less than 1 time by weight that of a binder resin; if the amount is lower than the lower limit, no sufficient sensitivity is obtained. It is preferred that the proportion of the charge transporting compound in the charge transporting medium is in the range of 0.2 to 2 times by weight that of a binder, more preferably in the range of 0.3 to 1.3 time. When a high molecular weight charge transporting compound which is per se usable as a binder is employed, it is unnecessary to use an other binder.

In preparation of the electrophotographic light sensitive element of the present invention, additives such as a plasticizer, a sensitizer, etc. can also be used together with a binder.

Conductive supports which can be used in the electrophotographic light sensitive element of the present invention include supports obtained by vapor depositing or coating a dispersion of conductive materials such as aluminum, $SnO_2$, etc. on a metal plate such as aluminum, copper, zinc, etc. or a plastic sheet or a plastic film such as a polyester, etc., or a paper sheet conductively treated, etc.

Examples of binders include condensation type resins such as polyamide, polyurethane, polyester, epoxy resin, polyketone, polycarbonate, etc., vinyl polymers such as polyvinyl ketone, polystyrene, poly-N-vinylcarbazole, polyacrylamide, etc.; other resins that are insulative and adhesive are all usable.

Examples of plasticizers include biphenyl, chlorinated biphenyl, o-terphenyl, p-terphenyl, dibutyl phthalate, dimethylglycol phthalate, dioctyl phthalate, triphenyl phosphate, methylnaphthalene, benzophenone, chlorinated paraffin, polypropylene, polystyrene, dilauryl thiodipropionate, 3,5-dinitrosalicylic acid, various fluorocarbon hydrates, etc.

In addition, silicone oil, etc. can also be incorporated to improve the surface property of the electrophotographic light sensitive element.

Examples of sensitizers include chloranil, tetracyanoethylene, methyl violet, rhodamin B, cyanine dyes, merocyanine dyes, pyrilium dyes, thiapyrilium dyes, etc.

Compounds which transport charges are generally classified into two groups: one group is compounds that transport electrons and another group is those that transport positive holes. In the electrophotographic light sensitive element of the present invention, both can be used. Examples of compounds that transport electrons are compounds having an electron-attractive group, e.g., 2,4,7-trinitro-9-fluorenone, 2,4,5,7-tetranitro-9-fluorenone, 9-dicyanomethylene-2,4,7-trinitrofluorenone, 9-dicyanomethylene-2,4,5,7-tetranitrofluorenone, tetranitrocarbazole chloranil, 2,3-dichloro-5,6-dicyanobenzoquinone, 2,4,7-trinitro-9,10-phenathrenequinone, tetrachlorophthalic anhydrice, tetracyanoethylene, tetracyanoquinodimethane, etc.

Compounds for transporting positive holds include compounds having an electron-donating group, e.g., high molecular weight compounds including:

(1) polyvinylcarbozole and derivatives thereof as described in Japanese Patent Publication No. 10966/59;

(2) vinyl polymers such as polyvinylpyrene, polyvinylanthracene, poly-2-vinyl-4-(4'-dimethylaminophenyl)-5-phenyloxazole, poly-3-vinyl-N-ethylcarbazole, etc., as described in U.S. Pat. Nos. 3,232,755 and 3,162,532.

(3) polymers such as polyacenaphthylene, polyindene or copolymers of acenaphthylene with styrene as described in U.S. Pat. No. 3,169,060;

(4) condensed resins such as pyrene-formaldehyde resin, bromopyrene-formaldehyde resin, ethyl carbazole-formaldehyde resin, etc. as described in U.S. Pat. Nos. 3,842,038 and 3,881,922, etc.;

(5) various triphenylmethane polymers as described in Japanese Patent Application OPI Nos. 90833/81 and 161550/81; and low molecular weight compounds including:

(6) triazole derivative as described in U.S. Pat. No. 3,112,197, etc.;

(7) oxadiazole derivatives as described in U.S. Pat. No. 3,189,447, etc.;

(8) imidazole derivatives as described in Japanese Patent Publication No. 16096/62, etc.;

(9) polyarylalkane derivatives as described in U.S. Pat. Nos. 3,615,402, 3,820,989, 3,542,544, 3,542,547, 3,963,799 and 4,127,412, Japanese Patent Application (OPI) Nos. 17105/80 4148/81, 108667/80, 156953/80, 93224/76 and 36656/81, etc.;

(10) pyrazoline derivatives and pyrazolone derivatives as described in U.S. Pat. Nos. 3,180,729, 3,837,851 and 4,278,746, Japanese Patent Application OPI Nos. 88064/80, 88065/80, 51086/80, 80051/81, 88141/81, 45545/82, 112637/79, 105537/74 and 74546/80, etc.;

(11) phenylenediamine derivatives as described in U.S. Pat. No. 3,615,404, Japanese Patent Publication No. 10105/76, Japanese Patent Application OPI Nos.

83435/79, 110836/79 and 119925/79, Japanese Patent Publication Nos. 3712/71 and 28336/72, etc.;

(12) arylamine derivatives as described in U.S. Pat. No. 3,567,450, Japanese Patent Publication No. 35702/74, German Patent (DAS) No. 1,110,518, U.S. Pat. Nos. 3,180,703, 3,240,597, 3,658,520, 4,232,103, 4,175,961 and 4,012,376, Japanese Patent Application OPI Nos. 144250/80 and 119132/81, Japanese Patent Publication No. 27577/64, Japanese Patent Application No. 22437/81, etc.;

(13) amino-substituted chalcone derivatives as described in U.S. Pat. No. 3,526,501;

(14) N,N-bicarbazyl derivatives as described in U.S. Pat. No. 3,542,546, etc.;

(15) oxazole derivatives as described in U.S. Pat. No. 3,257,203, etc.;

(16) styryl anthracene derivatives as described in Japanese Patent Application OPI No. 46234/81, etc.;

(17) fluorenone derivatives as described in U.S. Pat. No. 4,245,021, etc.;

(18) hydrazone derivatives as described in U.S. Pat. No. 3,717,462, Japanese Patent Application OPI Nos. 59143/79 (corresponding to U.S. Pat. No. 4,150,987), 52063/80, 52064/80, 46760/80, 85495/80 and 64244/82, Japanese Patent Application Nos. 85495/80 and 33832/81, etc.

In the present invention, the compounds which transport charges are not limited to compounds listed in (1) to (18) but all other known charge carrier-transporting compounds can be used.

These charge transporting materials can be used in a combination of two or more, if desired and necessary.

In the electrophotographic light sensitive element thus obtained, an adhesive layer or a barrier layer can also be provided, if necessary and desired, between the conductive support and the light sensitive layer. Materials used for these layers are polyamide, nitrocellulose, aluminum oxide, etc. It is preferred that the thickness of each of these layers be not greater than 1 μm.

The electrophotographic light sensitive element of the present invention has been described in detail. The electrophotographic light sensitive element of the present invention has characteristics that sensitivity is generally high and durability is excellent.

The electrophotographic light sensitive element of the present invention is widely applicable, in addition to electrophotographic copying, to fields of light sensitive elements for printers using a laser or Braun tube as a light source.

The photoconductive composition containing the disazo compound of the present invention can be used as a photoconductive layer of an imaging tube of a video camera and as a photoconductive layer of a solide-state imaging device containing a light-receiving layer (photoconductive layer) and provided over the entire surface of a one- or two-dimensionally arranged semi-conductor circuit that effects transfer of signals or scanning.

Further as is described in A. K. Ghosh and Tom Feng, *J. Appl. Phys.*, vol. 49 (12), page 5982 (1978), the photoconductive composition of the present invention can also be used as a photoconductive layer of a solar cell.

A printing plate having a high resolving power, high durability and high sensitivity can also be obtained, as disclosed in Japanese Patent Publication No. 17162/72, Japanese Patent Application OPI Nos. 19063/80, 161250/80 and 33579/81, etc., by dispersing the disazo compound of the present invention in an alkali soluble resin liquid such as a phenol resin, together with the foregoing charge transporting compounds such as oxadiazole derivatives, hydrazone derivatives, etc., coating the dispersion on a conductive support such as aluminum, etc., drying, imagewise exposing, toner developing and etching with an alkali aqueous solution. In addition, a print circuit can also be prepared.

The present invention will next be explained in more detail with reference to the examples but is not deemed to be limited to the examples, wherein all parts are by weight.

EXAMPLE 1

To 95 parts of dichloromethane, 1 part of disazo compound (1A), 5 parts of 4,4'-bis(diethylamino)-2,2'-dimethyltriphenylmethane and 5 parts of bisphenol A polycarbonate were added. The mixture was pulverized in a ball mill and mixed to prepare a liquid. The resulting coating liquid was coated on a conductive transparent support (which was prepared by depositing to form an indium oxide layer at the surface of a polyethylene terephthalate film having a thickness of 100 μm; surface resistivity, $10^3$ ohm) using a wire round rod and then dried to prepare an electrophotographic light sensitive element having a single layer type electrophotographic light sensitive layer having a thickness of about 9 μm.

The electrophotographic light sensitive element was electrically charged to +420 V through corona discharge of +5 KV using an electrostatic copying paper test apparatus (manufactured by Kawaguchi Electric Co., Ltd., Model SP-428) and then exposed to light using a tungsten lump having a color temperature of 3000° K. such that the surface showed 4 luxes. The time period required until the surface potential was decayed to half of the initial surface potential was determined; a half-decay exposure amount $E_{50}$ (lux·sec) was 8.3 (lux·sec). The $E_{50}$ value after repeating two steps of charging and exposure 3000 times was substantially the same.

EXAMPLES 2 TO 61

Electrophotographic light sensitive elements each having a single layer structure were prepared in a manner similar to Example 1 except that disazo compounds (2A), (3A), (4A), (5A), (6A), (11A), (13A), (48A), (53A), (61A), (1B), (2B), (3B), (4B), (5B), (25B), (26B), (49B), (54B), (62B), (1C), (3C), (4C), (5C), (11C), (13C), (25C), (48C), (55C), (63C), (1D), (2D), (4D), (5D), (13D), (18D), (26D), (49D), (56D), (64D), (1E), (2E), (5E), (11E), (13E), (19E), (29E), (44E), (57E), (65E), (1F), (3F), (5F), (11F), (13F), (26F), (29F), (45F), (53F), (61F) were employed in place of disazo compound (1A), respectively. The half-decay exposure amount of each of the electrophotographic light sensitive elements due to positive charging was measured in a manner similar to Example 1.

The results are shown in Table 2 below.

TABLE 2

| Example | Disazo Compound | $E_{50}$ (lux · sec) |
| --- | --- | --- |
| 2 | (2A) | 9.8 |
| 3 | (3A) | 8.2 |
| 4 | (4A) | 15.4 |
| 5 | (5A) | 20.2 |
| 6 | (6A) | 8.7 |
| 7 | (11A) | 27.3 |
| 8 | (13A) | 18.9 |
| 9 | (48A) | 18.8 |
| 10 | (53A) | 54.0 |

TABLE 2-continued

| Example | Disazo Compound | $E_{50}$ (lux · sec) |
|---|---|---|
| 11 | (61A) | 73.8 |
| 12 | (1B) | 40.0 |
| 13 | (2B) | 17.6 |
| 14 | (3B) | 19.6 |
| 15 | (4B) | 40.0 |
| 16 | (5B) | 24.7 |
| 17 | (25B) | 15.5 |
| 18 | (26B) | 19.9 |
| 19 | (49B) | 22.6 |
| 20 | (54B) | 46.6 |
| 21 | (62B) | 64.7 |
| 22 | (1C) | 6.4 |
| 23 | (3C) | 28.5 |
| 24 | (4C) | 9.7 |
| 25 | (5C) | 8.3 |
| 26 | (11C) | 17.8 |
| 27 | (13C) | 20.8 |
| 28 | (25C) | 12.5 |
| 29 | (48C) | 30.6 |
| 30 | (55C) | 54.1 |
| 31 | (63C) | 82.8 |
| 32 | (1D) | 15.1 |
| 33 | (2D) | 35.9 |
| 34 | (4D) | 48.4 |
| 35 | (5D) | 27.6 |
| 36 | (13D) | 39.7 |
| 37 | (18D) | 19.5 |
| 38 | (26D) | 35.6 |
| 39 | (49D) | 39.0 |
| 40 | (56D) | 91.9 |
| 41 | (64D) | 75.6 |
| 42 | (1E) | 28.1 |
| 43 | (2E) | 36.4 |
| 44 | (5E) | 25.8 |
| 45 | (11E) | 42.1 |
| 46 | (13E) | 26.3 |
| 47 | (19E) | 26.8 |
| 48 | (29E) | 32.8 |
| 49 | (44E) | 43.7 |
| 50 | (57E) | 54.6 |
| 51 | (65E) | 59.3 |
| 52 | (1F) | 19.8 |
| 53 | (3F) | 12.8 |
| 54 | (5F) | 12.4 |
| 55 | (11F) | 50.0 |
| 56 | (13F) | 16.8 |
| 57 | (26F) | 16.7 |
| 58 | (29F) | 14.9 |
| 59 | (45F) | 27.3 |
| 60 | (53F) | 35.4 |
| 61 | (61F) | 87.9 |

EXAMPLE 62

A mixture of 5 g of disazo compound (1A) and a solution of 2 g of polyvinyl butyral resin (degree of butyralization, 63 mol%) in 100 ml of ethanol was dispersed for 20 hours in a ball mill. Thereafter, the dispersion was coated on a conductive support (prepared by depositing to form an aluminum layer onto the surface of a polyethylene terephthalate film having a thickness of 100 μm; surface resistivity, $10^3$ ohms) using a wire round rod and then dried to prepare charge generating layer having a thickness of 1 μm.

Then, a solution of 2 parts of p-(diphenylamino)benzoaldehyde-N'-methyl-N'-phenylhydrazone having the following structure:

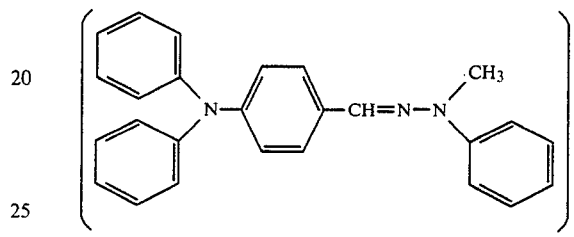

and 4 parts of bisphenol A polycarbonate in 60 parts of dichloromethane was coated on the thus obtained electron-generating layer and then dried to form a charge transporting layer having a thickness of 8 μm. Thus, an electrophotographic light sensitive element having an electrophotographic light sensitive layer composed of two layers was prepared.

After the electrophotographic light sensitive element was electrically charged to −400 V through corona discharge of −5 KV, the half-decay exposure amount was measured and $E_{50}$ showed 6.1 (lux·sec).

Electrophotographic light sensitive elements having a two layer structure were prepared in a manner similar to the above-described one except that disazo compounds (1G), (2G), (3G), and (4G) disclosed in Japanese Patent Publication No. 1194/81 and which are shown below were employed in lieu of disazo compound (1A), respectively. $E_{50}$ was measured in a similar fashion. The results are shown in Table 3.

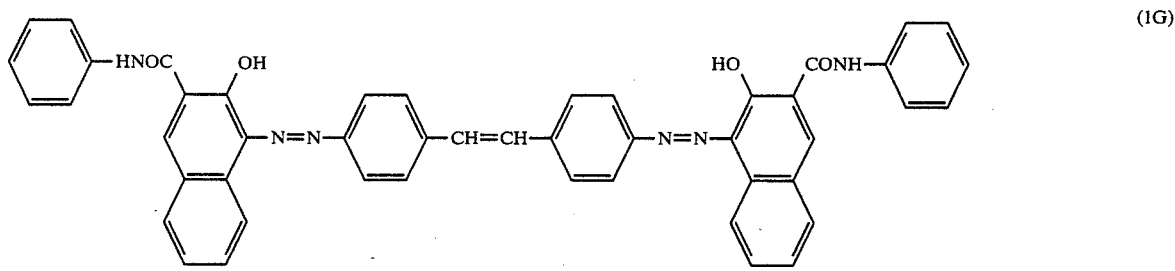

(1G)

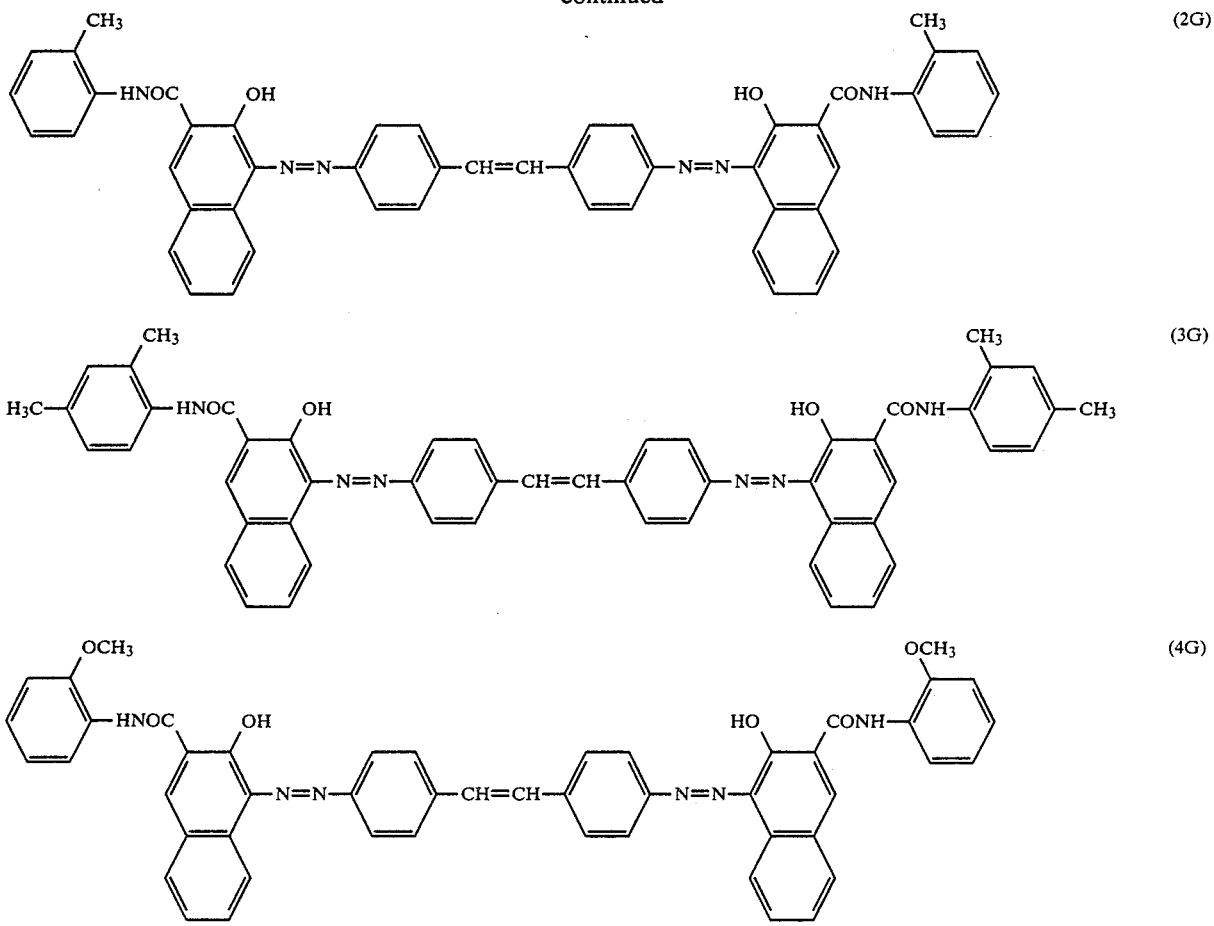

(2G)
(3G)
(4G)

TABLE 3

| Comparison Example | Disazo Compound | $E_{50}$ (lux · sec) |
|---|---|---|
| 1 | (1G) | 7.2 |
| 2 | (2G) | 7.6 |
| 3 | (3G) | 19 |
| 4 | (4G) | 34 |

From the results disclosed above, it is clear that the electrophotographic light sensitive elements of the present invention have higher sensitivity than that of the Comparison Examples, and former elements have sufficient properties for practical uses.

EXAMPLES 63 TO 110

Electrophotographic light sensitive elements having a two layer structure were prepared in a manner similar to Example 62 except that disazo compounds, (2A), (3A), (5A), (13A), (15A), (48A), (53A), (62A), (1B), (2B), (15B), (17B), (27B), (45B), (56B), (61B), (2C), (4C), (6C), (10C), (37C), (48C), (55C), (64C), (1D), (4D), (5D), (8D), (25D), (46D), (57D), (63D), (1E), (2E), (7E), (16E), (29E), (47E), (53E), (65E), (2F), (3F), (9F), (12F), (38F), (49F), (58F), (66F), were employed in lieu of disazo compound (1A), respectively. $E_{50}$ was measured in a similar fashion.

The results are shown in Table 4 below.

TABLE 4

| Example | Disazo Compound | $E_{50}$ (lux · sec) |
|---|---|---|
| 63 | (2A) | |
| 64 | (3A) | 18.3 |
| 65 | (5A) | 8.1 |
| 66 | (13A) | 12.4 |
| 67 | (15A) | 17.3 |
| 68 | (48A) | 15.8 |
| 69 | (53A) | 58.7 |
| 70 | (62A) | 79.2 |
| 71 | (1B) | 14.9 |
| 72 | (2B) | 34.8 |
| 73 | (15B) | 32.7 |
| 74 | (17B) | 24.7 |
| 75 | (27B) | 18.9 |
| 76 | (45B) | 45.6 |
| 77 | (56B) | 40.3 |
| 78 | (61B) | 89.0 |
| 79 | (2C) | 18.2 |
| 80 | (4C) | 45.0 |
| 81 | (6C) | 11.3 |
| 82 | (10C) | 35.3 |
| 83 | (37C) | 23.8 |
| 84 | (48C) | 26.8 |
| 85 | (55C) | 29.8 |
| 86 | (64C) | 86.1 |
| 87 | (1D) | 58.8 |
| 88 | (4D) | 53.7 |
| 89 | (5D) | 32.5 |
| 90 | (8D) | 11.1 |
| 91 | (25D) | 60.7 |
| 92 | (46D) | 17.9 |
| 93 | (57D) | 40.3 |
| 94 | (63D) | 98.1 |
| 95 | (1E) | 8.7 |
| 96 | (2E) | 20.8 |
| 97 | (7E) | 23.7 |

TABLE 4-continued

| Example | Disazo Compound | E₅₀ (lux · sec) |
|---|---|---|
| 98 | (16E) | 39.3 |
| 99 | (29E) | 37.9 |
| 100 | (47E) | 46.5 |
| 101 | (53E) | 84.8 |
| 102 | (65E) | 62.6 |
| 103 | (2F) | 20.1 |
| 104 | (3F) | 14.9 |
| 105 | (9F) | 28.2 |
| 106 | (12F) | 14.7 |
| 107 | (38F) | 23.2 |
| 108 | (49F) | 19.1 |
| 109 | (58F) | 50.2 |
| 110 | (66F) | 46.8 |

EXAMPLE 111

An electron-transporting layer having a thickness of 12 μm was formed on an electron-generating layer having a thickness of 1 μm in a manner similar to Example 62 except that 4 parts of 2,4,7-trinitro-9-fluorenone were employed as the electron-transporting layer in lieu of p-(diphenylamino)benzaldehyde-N'-methyl-N'-phenylhydrazone.

This electrophotographic light sensitive element was electrically charged to +600 V through a corona discharge of +5 KV and $E_{50}$ was measured; it was 26 (lux·sec).

EXAMPLES 112 TO 135

Electrophotographic light sensitive elements having a two layer structure were prepared in a manner similar to Example 111 except that disazo compounds (2A), (50A), (57A), (62A), (10B), (46B), (55B), (63B), (15C), (51C), (54C), (61C), (7D), (43D), (56D), (64D), (14E), (52E), (59E), (66E), (11F), (48F), (60F), (65F) were employed in lieu of disazo compound (1A), respectively. $E_{50}$ was measured in a similar fashion. The results are shown in Table 5.

TABLE 5

| Example | Disazo Compound | E₅₀ (lux · sec) |
|---|---|---|
| 112 | (2A) | 55.0 |
| 113 | (50A) | 37.9 |
| 114 | (57A) | 89.9 |
| 115 | (62A) | 49.2 |
| 116 | (10B) | 23.2 |
| 117 | (46B) | 48.8 |
| 118 | (55B) | 40.8 |
| 119 | (63B) | 48.6 |
| 120 | (15C) | 18.0 |
| 121 | (51C) | 73.2 |
| 122 | (54C) | 54.3 |
| 123 | (61C) | 74.3 |
| 124 | (7D) | 26.8 |
| 125 | (43D) | 36.9 |
| 126 | (56D) | 87.7 |
| 127 | (64D) | 35.0 |
| 128 | (14E) | 29.6 |
| 129 | (52E) | 14.0 |
| 130 | (59E) | 58.9 |
| 131 | (66E) | 56.2 |
| 132 | (11F) | 38.2 |
| 133 | (48F) | 90.8 |
| 134 | (60F) | 55.5 |
| 135 | (65F) | 12.8 |

EXAMPLE 136

To 25 parts of dichloromethane, 1 part of disazo compound (1A) and 1 part of bisphenol A polycarbonate were added. The mixture was pulverized in a ball mill and mixed to prepare a coating liquid. The coating liquid was coated on a conductive support (prepared by depositing to form an indium oxide layer onto the surface of a polyethylene terephthalate film having a thickness of 100 μm; surface resistivity, $10^3$ ohms) using a wire round rod and then dried to obtain an electrophotographic light sensitive element having a single layer type electrophotographic light sensitive layer having a thickness of about 9 μm.

After the electrophotographic light sensitive element was electrically charged to +450 V by a corona discharge of +5 KV, $E_{50}$ was measured and showed 33.5 (lux·sec).

EXAMPLES 137–160

A single layer type electrophotographic light sensitive element was prepared in a manner similar to Example 136 except that disazo compound (3A), (51A), (56A), (61A), (12B), (45B), (62B), (18C), (48C), (58C), (63C), (17D), (44D), (53D), (63D), (21E), (46E), (55E), (62E), (24F), (44F), (57F), (64F) were employed in place of disazo compound (1A), respectively. $E_{50}$ was measured in a similar fashion.

The results are shown in Table 6.

TABLE 6

| Example | Disazo Compound | E₅₀ (lux · sec) |
|---|---|---|
| 137 | (3A) | 28.4 |
| 138 | (51A) | 66.0 |
| 139 | (56A) | 62.2 |
| 140 | (61A) | 71.5 |
| 141 | (12B) | 25.5 |
| 142 | (45B) | 44.2 |
| 143 | (54B) | 70.7 |
| 144 | (62B) | 45.7 |
| 145 | (18C) | 68.6 |
| 146 | (48C) | 51.6 |
| 147 | (58C) | 43.3 |
| 148 | (63C) | 73.1 |
| 149 | (17D) | 32.8 |
| 150 | (44D) | 66.2 |
| 151 | (53D) | 29.3 |
| 152 | (63D) | 78.3 |
| 153 | (21E) | 46.6 |
| 154 | (46E) | 42.9 |
| 155 | (55E) | 54.0 |
| 156 | (62E) | 26.7 |
| 157 | (24F) | 56.7 |
| 158 | (44F) | 25.3 |
| 159 | (57F) | 22.0 |
| 160 | (64F) | 54.5 |

EXAMPLE 161

To 30 parts of ethylene glycol monomethyl ether, 1 part of disazo pigment (1A), 1 part of p-(diphenylamino)benzaldehyde-N'-methyl-N'-phenylhydrazone used in Example 62 and 6 parts of m-cresol formaldehyde resin were added. The mixture was pulverized in a ball mill and mixed to obtain a coating liquid. The coating liquid was coated on an aluminum plate of about 0.25 mm thickness which was grained using a grainer, cathodically oxidized and underwent sealing treatment, using a wire round rod. After drying at 90° C. for 10 minutes and at 50° C. for 1 day, a sample having a thickness of about 6 μm was prepared.

The sample was then subjected to a corona discharge until the surface potential showed 500 V. After exposing (300 lux·sec) to negative images using a tungsten light, reversal development was performed with Mitsubishi Dia Fax Master LOM-ED Toner (manufactured by Mitsubishi Paper Mfg. Co., Ltd.) to obtain very clear and sharp positive images on a base plate for printing.

The base plate for printing was immersed in a 10-fold diluted etching solution of DP-1 (made by Fuji Photo Film Co., Ltd., an aqueous sodium silicate solution) for 1 minute to dissolve out and eliminate the areas (non-image areas) of the light sensitive layer to which no toner was adhered. As a result, the pigment at the non-image areas was easily removed together with the binder so that a printing plate having clear images thereon could be formed.

While the invention has been described in detail and with reference to specific embodiments thereof, it will be apparent to one skilled in the art that various changes and modifications can be made therein without departing from the spirit and scope thereof.

What is claimed is:

1. A photoconductive composition comprising a disazo compound represented by general formula (I):

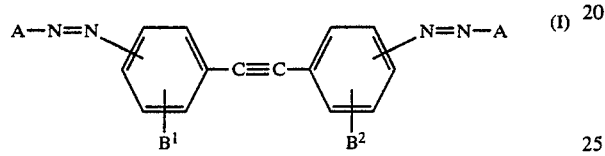

wherein:

A represents

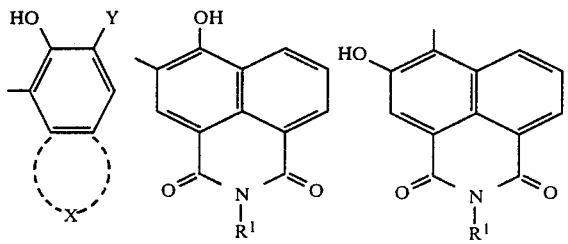

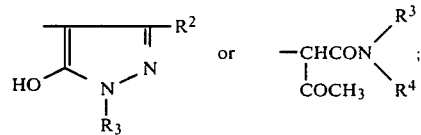

$B^1$ and $B^2$ each represents a hydrogen atom, an alkoxy group, a halogen atom, or a lower alkyl group X represents an atomic group necessary to complete an aromatic ring or a heterocyclic ring, wherein said ring may be substituted or unsubstituted, by condensing with the benzene ring in the above formula to which a hydroxy group and Y are attached;

Y represents

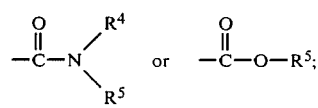

$R^1$ represents a hydrogen atom, an alkyl group, a phenyl group or a substituted group thereof;

$R^2$ represents a hydrogen atom, a lower alkyl group, a carbamoyl group, a carboxyl group, an alkoxycarbonyl group, an aryloxycarbonyl group, or a substituted or unsubstituted amino group;

$R^3$ and $R^5$ each represents an alkyl group, an aromatic ring group, a heterocyclic aromatic ring group or a substituted group thereof;

$R^4$ represents a hydrogen atom, an alkyl group, a phenyl group or a substituted group thereof.

2. A photoconductive composition as claimed in claim 1, wherein $R^1$ is a hydrogen atom, an alkyl group containing 1 to 12 carbon atoms, a phenyl group or a substituted group thereof.

3. A photoconductive composition as claimed in claim 1, wherein $R^2$ is a hydrogen atom, a lower alkyl group containing 1 to 6 carbon atoms, a carbamoyl group, a carboxyl group, an alkoxycarbonyl group having an alkoxy group containing 1 to 12 carbon atoms, an aryloxycarbonyl group having an aryloxy group containing 6 to 20 carbon atoms, or a substituted or unsubstituted amino group.

4. A photoconductive composition as claimed in claim 1, wherein $R^3$ and $R^5$ each represents an alkyl group containing 1 to 20 carbon atoms, an aromatic group, a heteroaromatic group containing an oxygen atom, a nitrogen atom or a sulfur atom, or a substituted group thereof.

5. A photoconductive composition as claimed in claim 1, wherein $R^4$ is a hydrogen atom, an alkyl group containing 1 to 20 carbon atoms, a phenyl group or a substituted group thereof.

6. A photoconductive composition as claimed in claim 1, wherein X is a group capable of forming a naphthalene ring, an anthrathene ring, an indole ring, a carbazole ring, a benzocarbazole ring or a dibenzofuran ring.

7. An electrophotographic light sensitive element comprising an electrophotographic light sensitive layer containing a disazo compound represented by general formula (I)

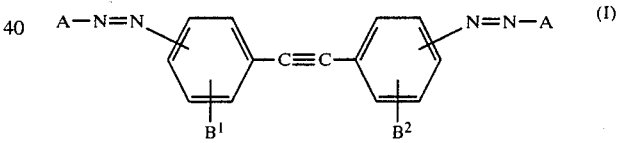

wherein:

A represents

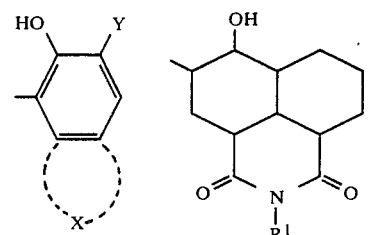

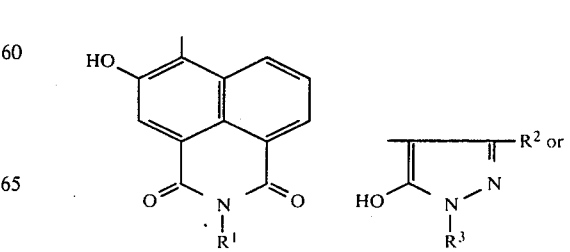

-continued

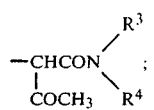

$B^1$ and $B^2$ each represents a hydrogen atom, an alkoxy group, a halogen atom, or a lower alkyl group;

X represents an atomic group necessary to complete an aromatic ring or a heterocyclic ring (said ring may be substituted or unsubstituted), by condensing with the benzene ring in the above formula to which a hydroxy group and Y are attached;

Y represents:

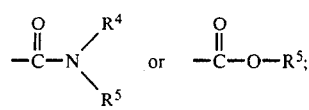

$R^1$ represents a hydrogen atom, an alkyl group, a phenyl group or a substituted group thereof;

$R^2$ represents a hydrogen atom, a lower alkyl group, a carbamoyl group, a carboxyl group, an alkoxycarbonyl group, an aryloxycarbonyl group, or a substituted or unsubstituted amino group;

$R^3$ and $R^5$ each represents an alkyl group, an aromatic ring group, a heterocyclic aromatic ring group or a substituted group thereof;

$R^4$ represents a hydrogen atom, an alkyl group, a phenyl group or a substituted group thereof.

8. An electrophotographic light sensitive element, as claimed in claim 7, wherein the electrophotographic light sensitive layer is provided on a conductive support.

9. An electrophotographic light sensitive element as claimed in claim 7, wherein the electrophotographic light sensitive layer comprising a binder or a charge transporting medium and disazo compounds represented by the general formula (I) which is dispersed therein.

10. An electrophotographic light sensitive element as claimed in claim 7, wherein said light sensitive layer comprising a charge generating layer containing disazo compounds represented by the general formula (I), and a charge transporting layer is provided thereon.

11. An electrophotographic light sensitive element as claimed in claim 9, wherein the electrophotographic light sensitive layer has a thickness in the range of 3 to $30\mu$.

12. An electrophotographic light sensitive element as claimed in claim 7, wherein the disazo compounds are present in the form of particles having a size of $5\mu$ or less.

13. An electrophotographic light sensitive element as claimed in claim 9, wherein the electrophotographic light sensitive layer includes a binder and the disazo compounds which are present in the electrophotographic light sensitive layer in a weight amount of 0.01 to 2 times the weight of the binder.

14. An electrophotographic light sensitive element as claimed in claim 10, wherein the charge generating layer has a thickness of $4\mu$ or less.

15. An electrophotographic light sensitive element as claimed in claim 10, wherein the disazo compounds are present in the charge generating layer in a weight amount of 1 or more times the weight of the binder.

* * * * *